United States Patent
Koyata et al.

(10) Patent No.: US 7,818,213 B2
(45) Date of Patent: Oct. 19, 2010

(54) COMMUNICATION SYSTEM, COMMUNICATION APPARATUS, COMMUNICATION METHOD, RECORD MEDIUM, AND PROGRAM

(75) Inventors: Tomohiro Koyata, Tokyo (JP); Tetsuya Hiroe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1833 days.

(21) Appl. No.: 10/110,672

(22) PCT Filed: Aug. 16, 2001

(86) PCT No.: PCT/JP01/07050

§ 371 (c)(1), (2), (4) Date: Apr. 16, 2002

(87) PCT Pub. No.: WO02/17170

PCT Pub. Date: Feb. 28, 2002

(65) Prior Publication Data

US 2002/0156705 A1    Oct. 24, 2002

(30) Foreign Application Priority Data

Aug. 18, 2000  (JP)  ............................. 2000-248956

(51) Int. Cl.
G06Q 30/00   (2006.01)
(52) U.S. Cl. .......................................... 705/26; 705/37
(58) Field of Classification Search ................... 705/26, 705/37
See application file for complete search history.

(56) References Cited

U.S. PATENT DOCUMENTS 6,185,683 B1 * 2/2001 Ginter et al. ............... 713/176
6,978,256 B2   12/2005 Okayama et al.
2002/0087475 A1  7/2002 Okayama et al.

FOREIGN PATENT DOCUMENTS

JP    10-302150    11/1998

(Continued)

OTHER PUBLICATIONS

McWilliams, Gary, Wall Street Journal Europe, Technology (A Special Report)—the PC's New Tune: The computer hasn't replaced the stereo; Yet; Wall Street Journal. (Europe). Brussels: Jun 29, 2000. p. R.4, downloaded from ProQuest Direct on the Internet on Jun. 7, 2009, 5 pages.*

*Primary Examiner*—James ZUrita
(74) *Attorney, Agent, or Firm*—Finnegan, Henderson, Farabow, Garrett & Dunner, L.L.P.

(57) ABSTRACT

A server system in the form of an automatic vending machine is disposed in a store. A distributor has a main server. A reproducing and connecting device is disposed in a home. The server system and the main server are connected through a bi-directional dedicated line and whole music information (music data and additional information) is transmitted therebetween. The main server 2 and the reproducing and connecting device are connected through the Internet. Additional information of music information is transferred from the main server to the reproducing and connecting device. The user searches for a song that he or she will buy corresponding to the additional information and decides to buy the selected song. In the store, the user can record a song that he or she has decided to buy corresponding to buying information to a record medium.

21 Claims, 20 Drawing Sheets

FOREIGN PATENT DOCUMENTS

| | | |
|---|---|---|
| JP | 2000-194763 | 12/1998 |
| JP | 11-45515 | 2/1999 |
| JP | 11-185381 | 7/1999 |
| JP | 11-312175 | 11/1999 |
| JP | 2000-148852 | 5/2000 |
| KR | 2000-48434 | 12/1999 |
| KR | 2000-37057 | 7/2000 |
| WO | 00/00972 | 1/2000 |

* cited by examiner

Fig. 2

| CONTENT NUMBER | MAIN INFORMATION | TEXT INFORMATION | VIDEO INFORMATION | OTHER INFORMATION | FADE-IN | | | FADE-OUT | | |
|---|---|---|---|---|---|---|---|---|---|---|
| | | | | | POSITION | LENGTH | SHAPE | POSITION | LENGTH | SHAPE |
| 1 | SongA.dat | SongA.txt | SongA.jpg | ......... | 2'11 | 5sec | sin | 2'41 | 5sec | sin |
| 2 | SongB.dat | SongB.txt | SongB.jpg | ......... | 0'45 | 3sec | sin | 1'15 | 2sec | log |
| 3 | SongC.dat | SongC.txt | SongC.jpg | ......... | 1'00 | 3sec | 1in | 1'30 | 5sec | sin |
| ...... | ...... | ...... | ...... | ......... | ...... | ...... | ...... | ...... | ...... | ...... |

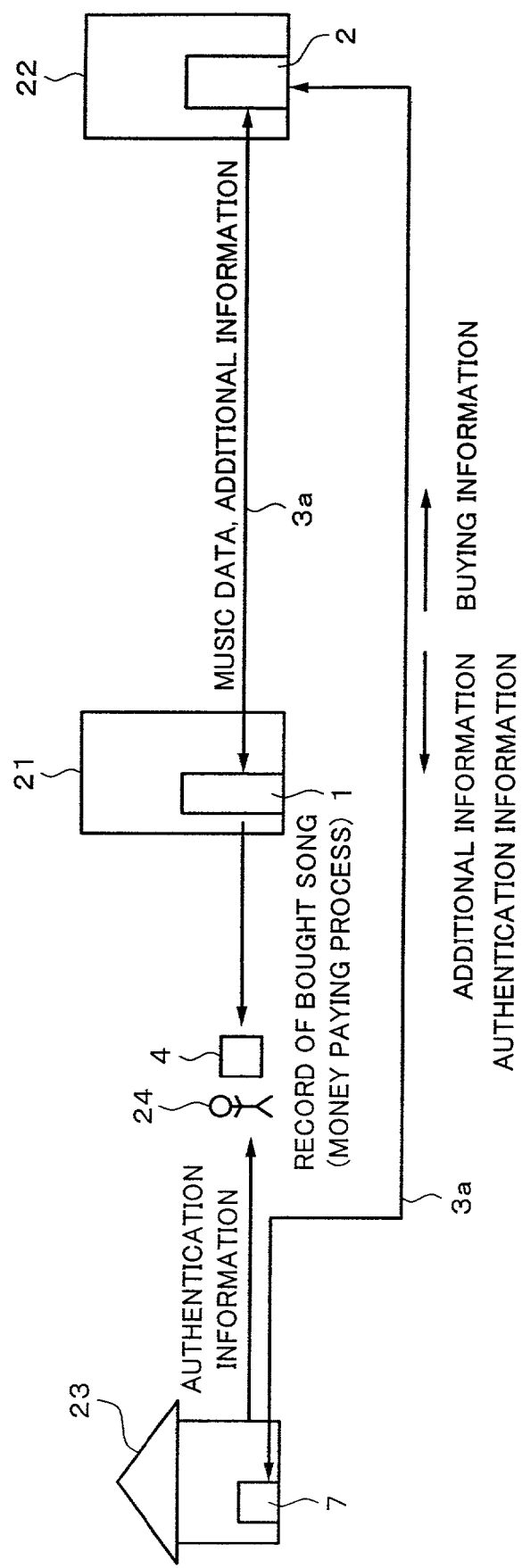

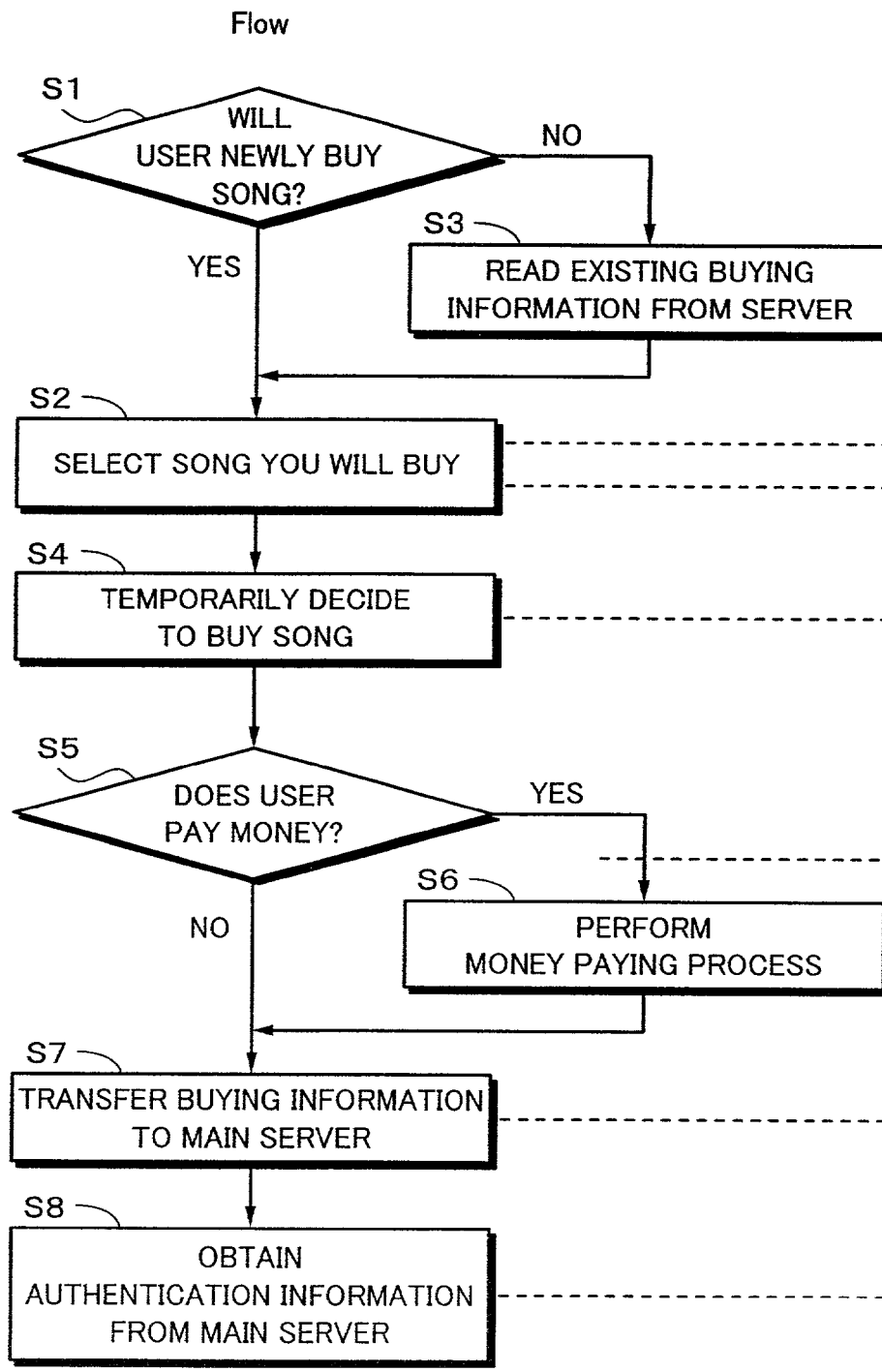

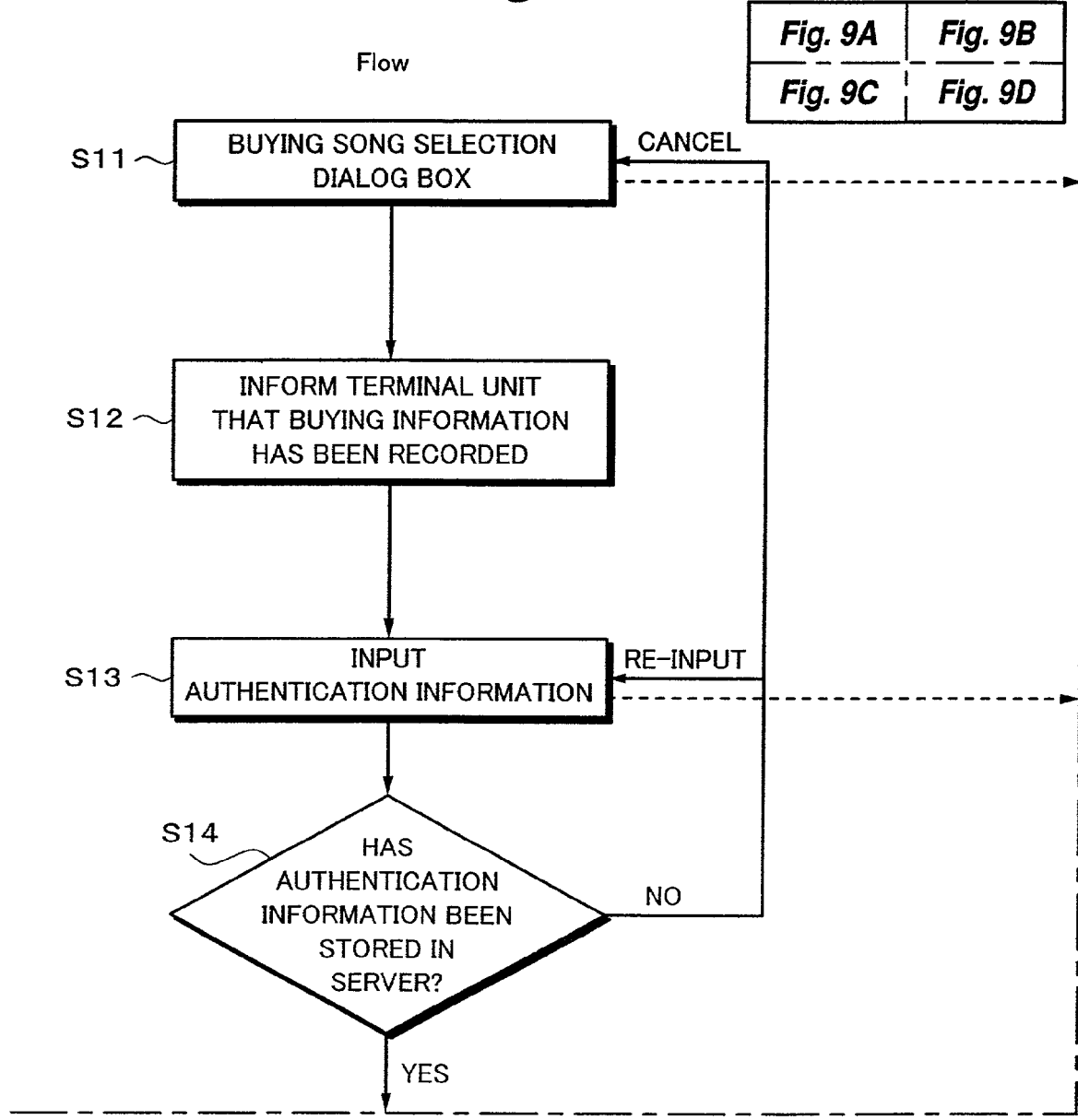

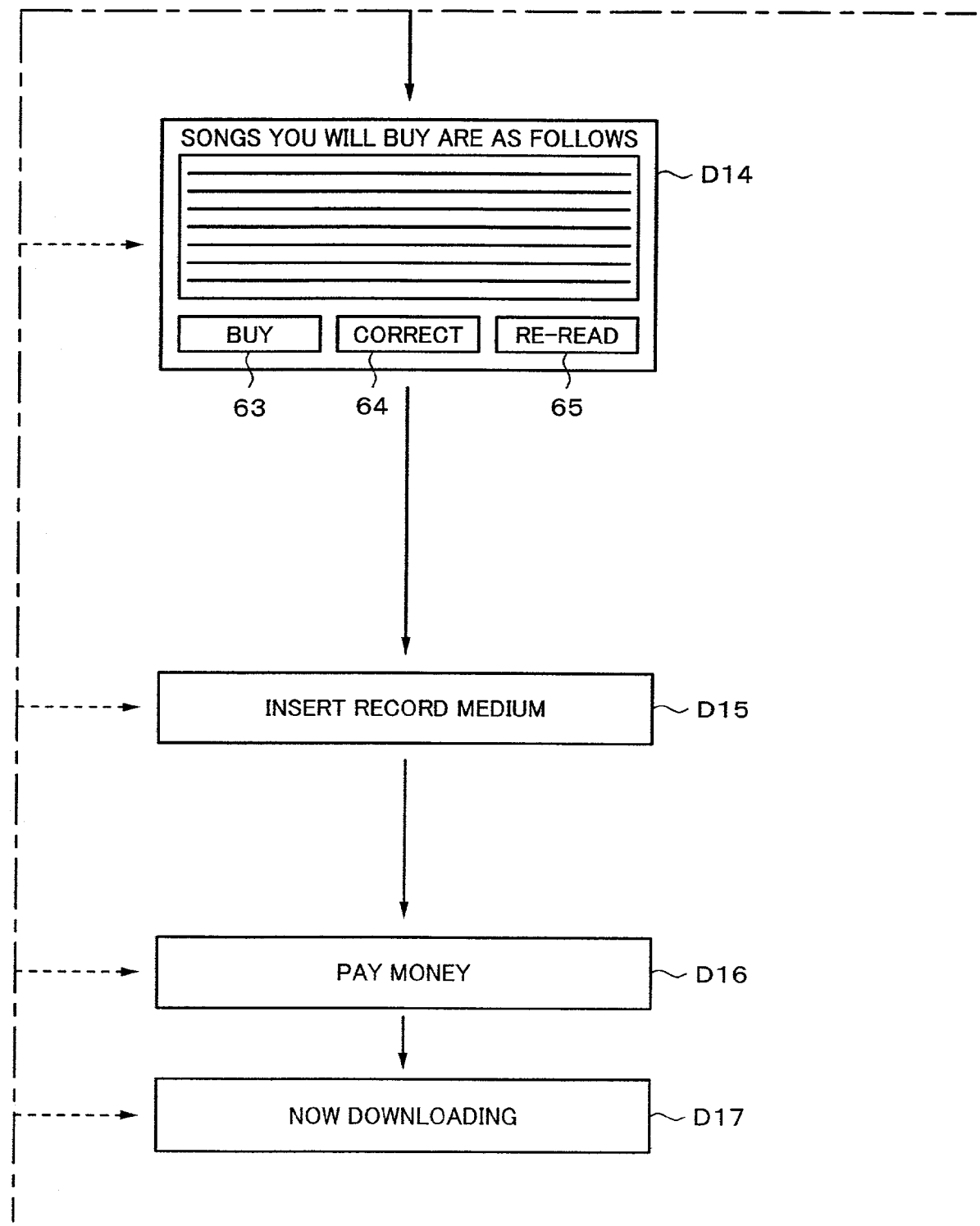

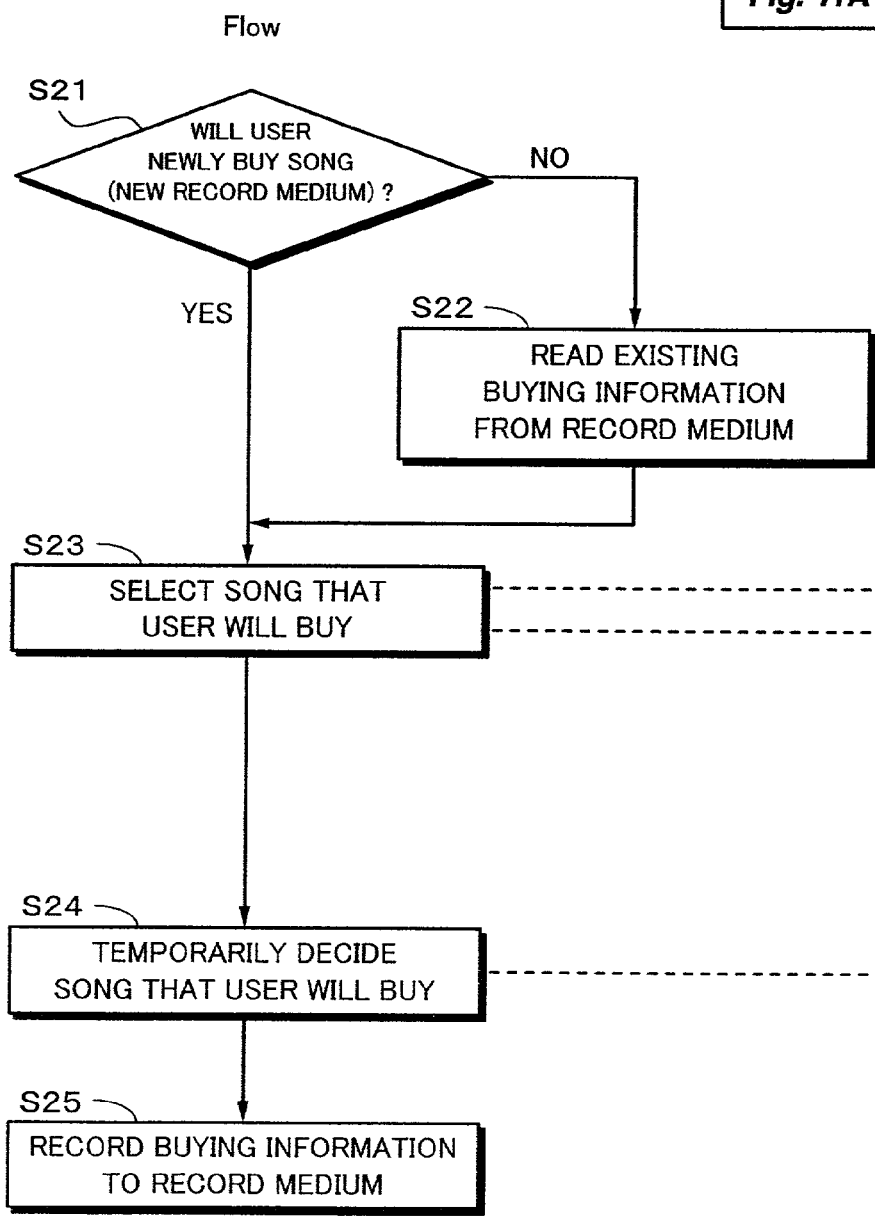

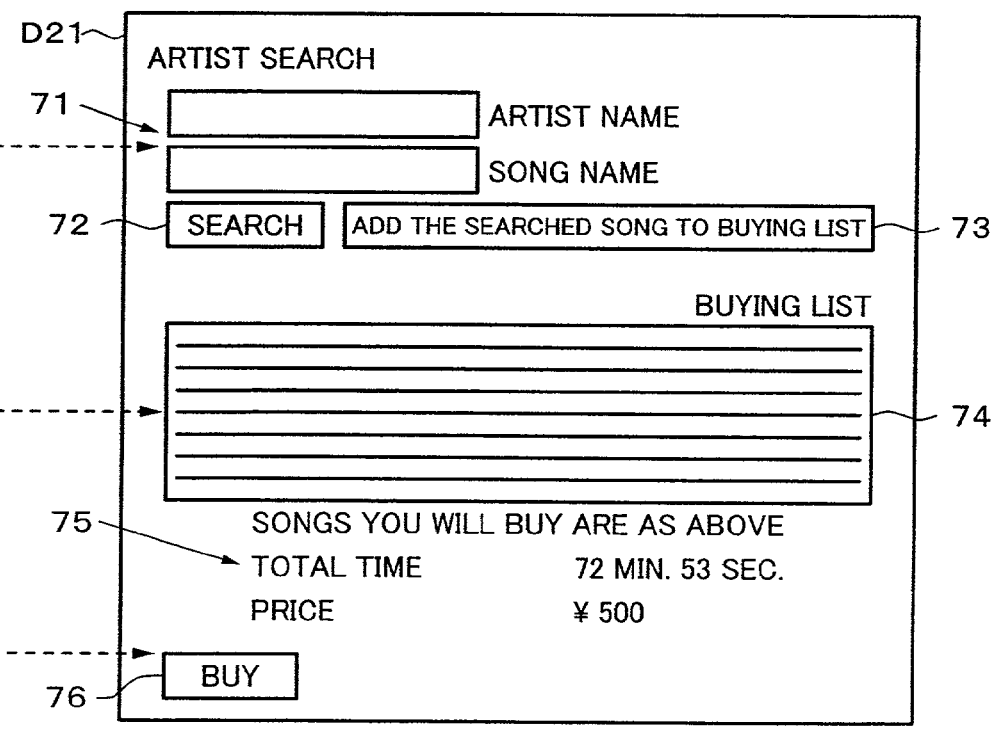

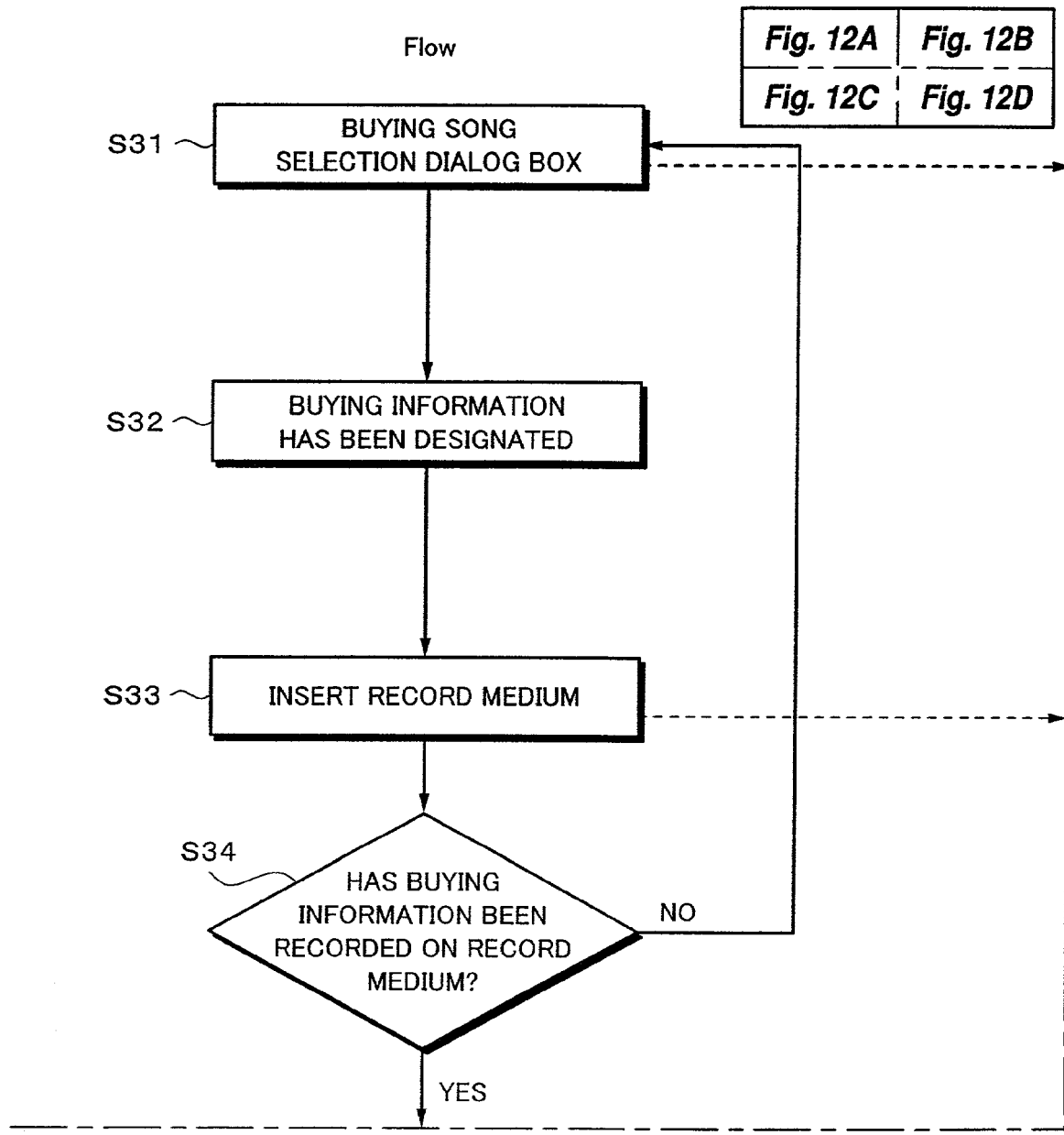

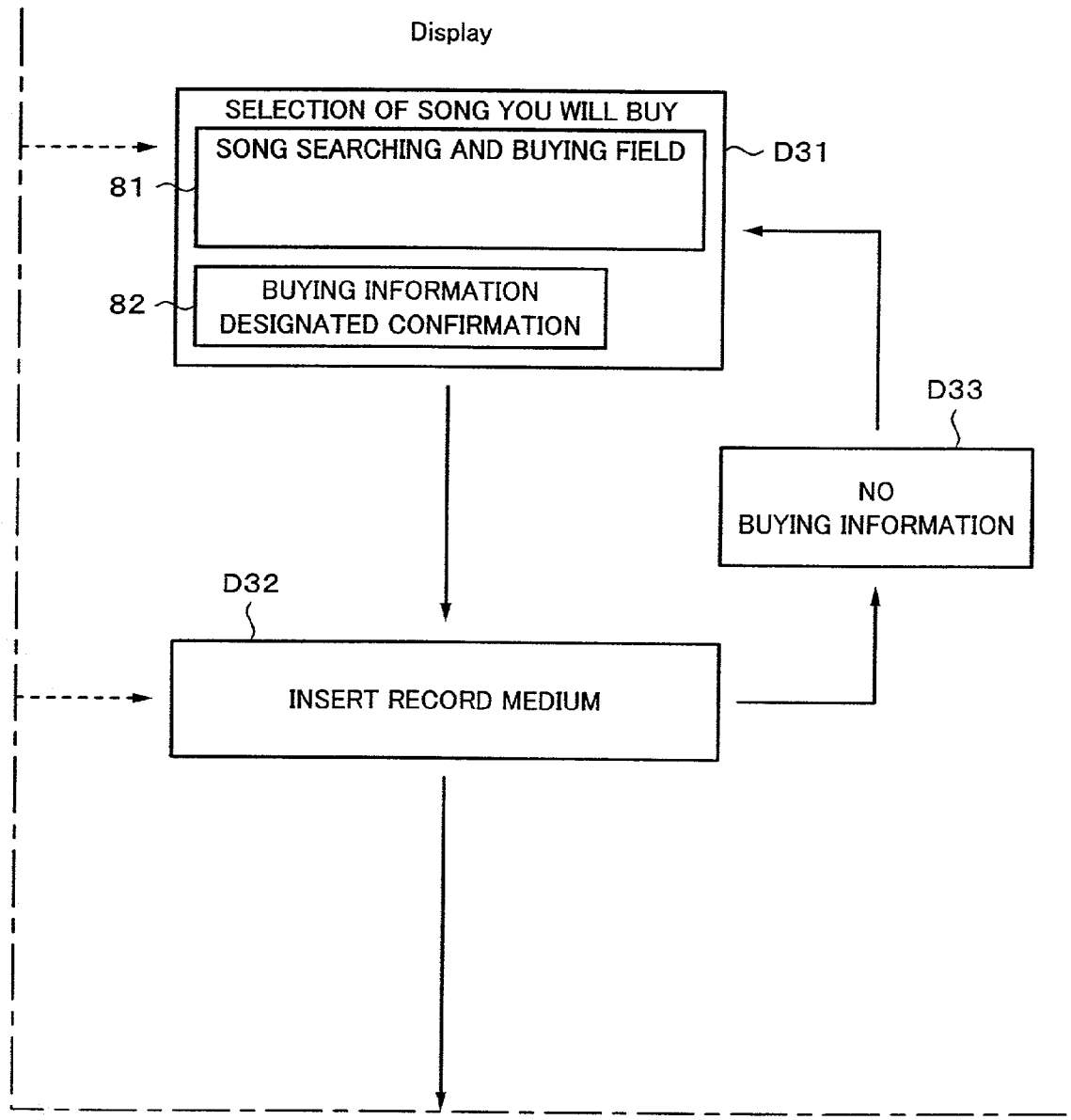

COMMUNICATION SYSTEM, COMMUNICATION APPARATUS, COMMUNICATION METHOD, RECORD MEDIUM, AND PROGRAM

TECHNICAL FIELD

The present invention relates to a communicating system, a communicating apparatus, a communicating method, a record medium, and a program applicable for a music distribution.

BACKGROUND ART

There are several methods as means for providing and buying a music signal. For example, as one method, a medium for example a CD (Compact Disc) on which music has been recorded is bought. As another method, music can be bought by receiving a radio broadcast and recording a music signal of the radio broadcast to a record medium.

Recently, a method for providing and buying music using a server system that stores a large amount of music data to a hard disk, transfers particular music data of the hard disc to an external record medium, and records the transferred music data to the record medium is known. For example, server systems are disposed in stores and train stations. A user who will buy music data takes a record medium to a store pays a predetermined amount of money to the store, and records the music data stored in the server system to the record medium. As a result, the user can buy music data from the server system.

Generally, music information stored in a server system has been compressed in consideration of storage capacity, transfer rate, and so forth thereof. Thus, music data can be transferred and recorded in a shorter time than the real performance time. Additional information such as title, performer, performance time, and so forth of music can be checked in the forms of text and graphics by the server system. Corresponding to the additional information, the user can select a song that he or she will buy. In addition, the user can listen to demos of music information stored in the server system.

When the user buys music using a sever system disposed in a store or the like, he or she should perform determinations and operations for determining music that he or she will buy, performing a money paying process, and so forth in the store. When the user has not decided music that he or she will buy, he or she searches for music information and listens to demos of music. Thereafter, the user decides music that he or she will buy. The larger the amount of music stored in the server system, the longer the user should spend time for selecting music in the store. Thus, the user cannot smoothly buy his or her desired music. On the other hand, when a music distributor advertises music information stored in the server, with the operation screen and so forth of the server system disposed at the store, only a limited amount of information can be provided. Thus, with the operation screen and so forth of the server system, advertisements cannot be sufficiently performed. To solve a problem of which it is necessary to take a long time to record music information, a technology for predicting and providing a record completion time of music information has been disclosed (as Japanese Patent Laid-open Publication No. 11-45515). However, such a technology cannot solve a problem with respect to searching for contents that the user will buy and to listening of demos thereof.

Therefore, an object of the present invention is to provide a distributing server, a terminal unit, a record medium, a content distributing system, and a distributing method that allow the user to easily and fully select music that he or she will buy and to quickly and securely select music that he or she has decided to buy and a music information provider to obtain many information providing means for users who will buy music.

DISCLOSURE OF THE INVENTION

According to the present invention, the user need neither search for contents nor listen to demos thereof with a terminal unit such as an automatic vending machine that downloads content data to a record medium. Instead, the user can perform such operations in his or her house. Thus, the user can easily and fully select music that he or she will buy. When the user has decided to buy music, he or she can quickly and securely select music. In addition, the situation of which one user occupies a distributing terminal unit for a long time can be prevented. Thus, the system can be effectively operated.

BRIEF DESCRIPTION OF DRAWINGS

FIG. 2 is a schematic diagram showing an example of additional information;

FIG. 7 is a block diagram showing a content distributing system according to an embodiment of the present invention;

FIG. 11 is a flow chart for explaining a process according to the other embodiment of the present invention.

BEST MODES FOR CARRYING OUT THE INVENTION

Figure 1:
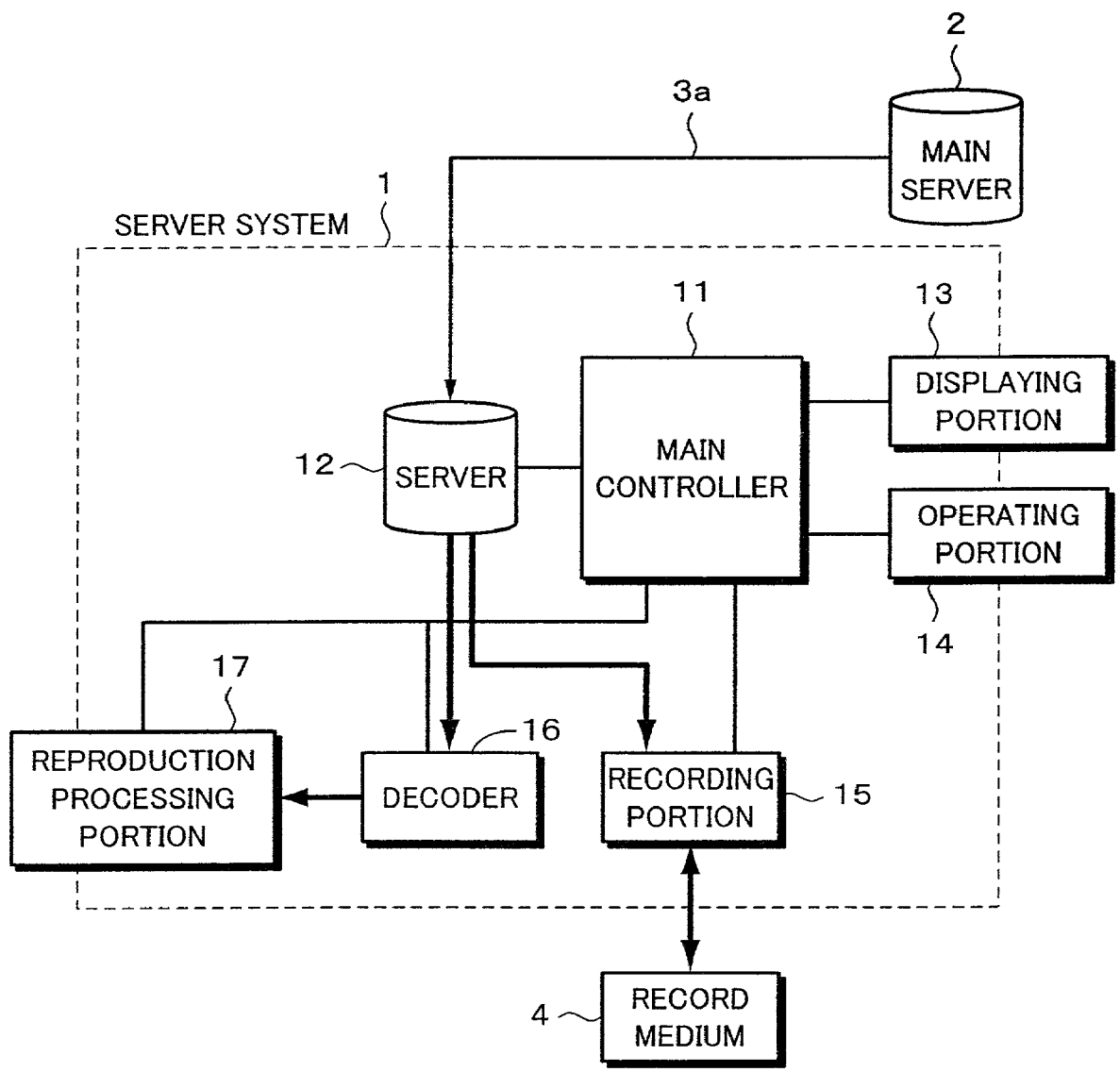
FIG. 1 is a block diagram showing the structure of an example of a server system.

Next, with reference to the accompanying drawings, an embodiment of the present invention will be described. To allow the reader to easily understand the present invention, before explaining an embodiment of the present invention, examples of a music distributing system will be described. FIG. 1 shows the structure of a server system that stores music information and records music information to a record medium. In FIG. 1, reference numeral 1 represents a server system disposed in a store or the like. Reference numeral 2 represents a main server that a music distributor has. Many server systems including the server system 1 are connected to the main server 2 through for example a dedicated line 3a. Music data, additional information, and so forth are exchanged between the server system 1 and the main server 2.

The server system 1 has a main controller designated by 11. The main controller 11 controls the overall operations of the server system 1. In reality, the main controller 11 is composed of a computer. Reference numeral 12 represents a server equivalent to a record medium that stores music information. The server 12 that stores a large amount of music information is composed of for example a hard disk.

Music information stored in the server 12 is composed of main information (composed of music data), music title, performance time, jacket photograph, and additional information such as price information of each song. It is preferred to compress a digital audio signal as the main information in consideration of the effective use of the storage capacity of the server and the capacity of the dedicated line 3a upon a data transfer to the server system 1. As long as the digital audio signal can be recorded to a record medium, as a compression format in which the signal can be recorded to the record medium at high speed, any of for example ATRAC (Adaptive TRansform Acoustic Coding) (trade mark), ATRAC3 (Adaptive TRansform Acoustic Coding 3) (trade mark), MP3 (MPEG-1 Audio Layer 3), MPEG-2AAC (Advanced Audio Coding) (trade mark), QDesign Music Codec (trademark), Twin VQ (Transform-Domain Weighted Interleave Vector Quantization) (trademark), MS Audio (Microsoft Audio (WMA: Windows Media Audio) (trademark), Ogg Vorbis (trademark), and so forth can be used.

Additional information can be managed in such a manner that a management table file as shown in FIG. 2 is provided, the relation between a file name of main information and additional information is described, and the table is updated and read by the main controller 11. In the example shown in FIG. 2, additional information is structured as a file. The file name of the additional information is managed. For example, when the file name of main information is "SongA.dat", the file name of additional information (text information) for the main information is "SongA. txt", whereas the file name of additional information (video information) is "SongA.jpg". The table of the additional information and the data of the additional information are stored in the server 12 along with the main data. Alternatively, the table of the additional information and the data of the additional information may be stored to a dedicated storing device that does not store the main data. In addition, it is not necessary to manage the additional information as a file. For example, text information may be described in additional information in text format.

Additional information labeled "other information" in FIG. 2 is for example copyright information of music, emphasis information representing presence/absence or characteristic of emphasis, and so forth. Another example of additional information is performance time of music. In addition to the case that performance time is treated as additional information, the performance time may be calculated using the file size of main information and the compression ratio of highly efficient coding when information of performance time required (for example, music information is recorded).

In the example shown in FIG. 2, as additional information, information of fade-in and fade-out is represented. These information represents a start point, a time period, and a fade shape (curve) for a demo of music. In the example shown in FIG. 2, the time period from the start position of fade-in to the start position of fade-out is 30 seconds. When the user listens to a demo of music prior to buying it, the demo of music is reproduced corresponding to the data. Thus, the demo time period is set to 30 seconds.

As for the fade process, in the highly efficient coding format (ATRAC: Adaptive Transfer Acoustic Coding) used in for example a mini disc (hereinafter abbreviated as MD), when normalization information is edited, the fade process can be performed. Not only a demo of music is reproduced, but demo data can be written to a record medium. Using this method, a large amount of demo data can be recorded. The use can listen to demos of desired positions and time periods. In addition, the user can search for desired music.

A displaying portion 13 connected to the main controller 11 of the server system 1 displays details of music information stored in the server 12 and states of record, reproduction, and so forth. An operating portion 14 performs a recording process, a reproducing process, and so forth for a record medium through the main controller 11. In the structure shown in FIG. 1, one server system 1 is used. However, as for the displaying portion 13 and the operating portion 14, the display, the keyboard, and the mouse of an external device for example a personal computer can be used. In this case, the server system 1 and the personal computer are connected through a dedicate line, a serial connection, USB (Universal Serial Bus), IEEE 1394, or the like that communicates additional information and a control signal therebetween.

A recording portion 15 disposed in the server system 1 records main information and additional information to an external record medium 4 corresponding to a command received from the operating portion 14 under the control of the main controller 11. Since the record medium 4 is detachable (replaceable), it is preferred that it can be easily carried as a package and reproduced by a small reproducing device. Examples of the record medium 4 are an optical disc, a magneto-optical disc, a magnetic disc, a memory card (IC card), and so forth that are recordable. For example, Memory Stick (trademark), SD Memory Card (trademark), Compact Flash (trademark), Smart Media (trademark), Multimedia Card (trademark), Micro Drive (trademark), ID Format (trademark), Thumb Drive (Trademark), and so forth can be used. In this example, for example, MD as a magneto-optical disc can be used.

When MD is used as the record medium 4, the recording portion 15 is composed of a spindle motor (that rotates the MD), an optical head, a magnetic head, a servo circuit, and so forth. In other words, the MD is rotated and driven by the spindle motor. Data is recorded corresponding to magnetic field modulating method of which while laser light is radiated to the MD by the optical head, a magnetic field modulated corresponding to record data is applied to the MD by the magnetic head. In this case, the servo circuit properly controls the tracking and focusing along record tracks of the MD.

Music data as main information of music stored in the server 12 is compressed in a compression formation (highly efficient coding system) used for the record medium 4. As a result, the storage capacity of the server system 12 can be effectively used. In addition, when data stored in the server 12 is recorded to the record medium 4 by the recording portion 15, since decoding and encoding processes are not required, the record time can be shortened.

In addition, MD has an area for music management information referred to as TOC (Table Of Contents). In the TOC, additional information such as titles of music is recorded in a predetermined format. Thus, the main controller 11 controls the recording portion 15 so that it records additional information of music stored in the server 12 in the TOC format of the MD corresponding to management information (for example, file names) shown in FIG. 2. In such a manner, the main information and the additional information are correlated on the external record medium 4 such as MD like the server system 1.

Reference numeral 16 represents a decoder that decodes highly efficiently coded music information stored in the server 12. Music data that is extracted from the server 12 and decoded by the decoder 16 is supplied to a reproduction processing portion 17. The reproduction processing portion 17 is composed of a D/A converter, an audio amplifier, a headphone, and so forth. The reproduction processing portion 17 is used by the user when he or she reproduces a demo of music before recording it.

Figure 3:
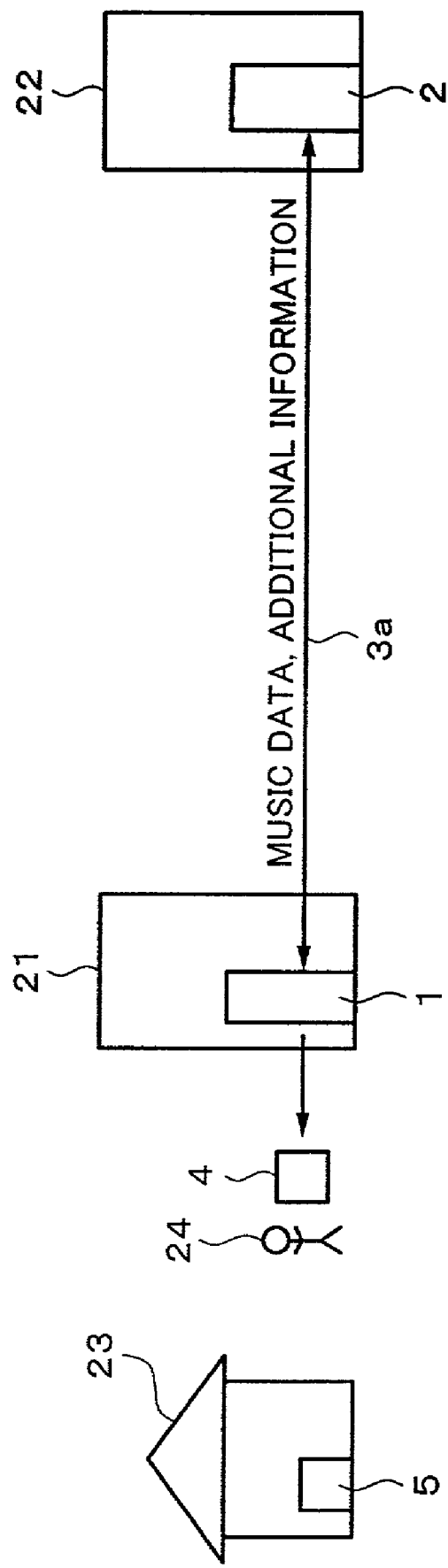
FIG. 3 is a block diagram showing an example of a content distributing system.

Next, with reference to FIGS. 3 and 4, an example of the use of the above-described server system 1 will be described. In FIG. 3, reference numeral 21 represents a store. Reference numeral 22 represents a distributor. Reference numeral 23 represents a home. The server system 1 is disposed in the store 21. The store 21 is for example a seller of a package media such as CD or DVD, a station, a convenience store, or an service area of a road. The server system 1 is structured as an automatic vending machine. The server system 1 has any money receiving device. In addition, the server system 1 has a function for managing prices of music information. In FIG. 3, one server system 1 is shown. In reality, however, many server systems 1 are connected to the main server 2 of the distributor 22.

The distributor 22 distributes music data and additional information to the server system 1 through the dedicated line 3a. The distributor 22 sends data from the main server 2 to the server 12 of the server system 1 at predetermined intervals (for example, once per month) and updates the contents stored in the server 12. A user (consumer) 24 takes his or her record medium to the store 21. In the store 21, the user 24 buys desired music in such a manner that he or she records it to the record medium 4. When the user selects music that he or she will buy in the store 21, he or she operates the operating portion 14 while seeing information displayed on the displaying portion 13 and listens to demos of music that he or she may buy. The amount of money corresponding to music that the user will buy is paid to the server system 1. The user can buy a record medium 4 in the store or from the automatic vending machine without need to take it to the store.

Figure 4:
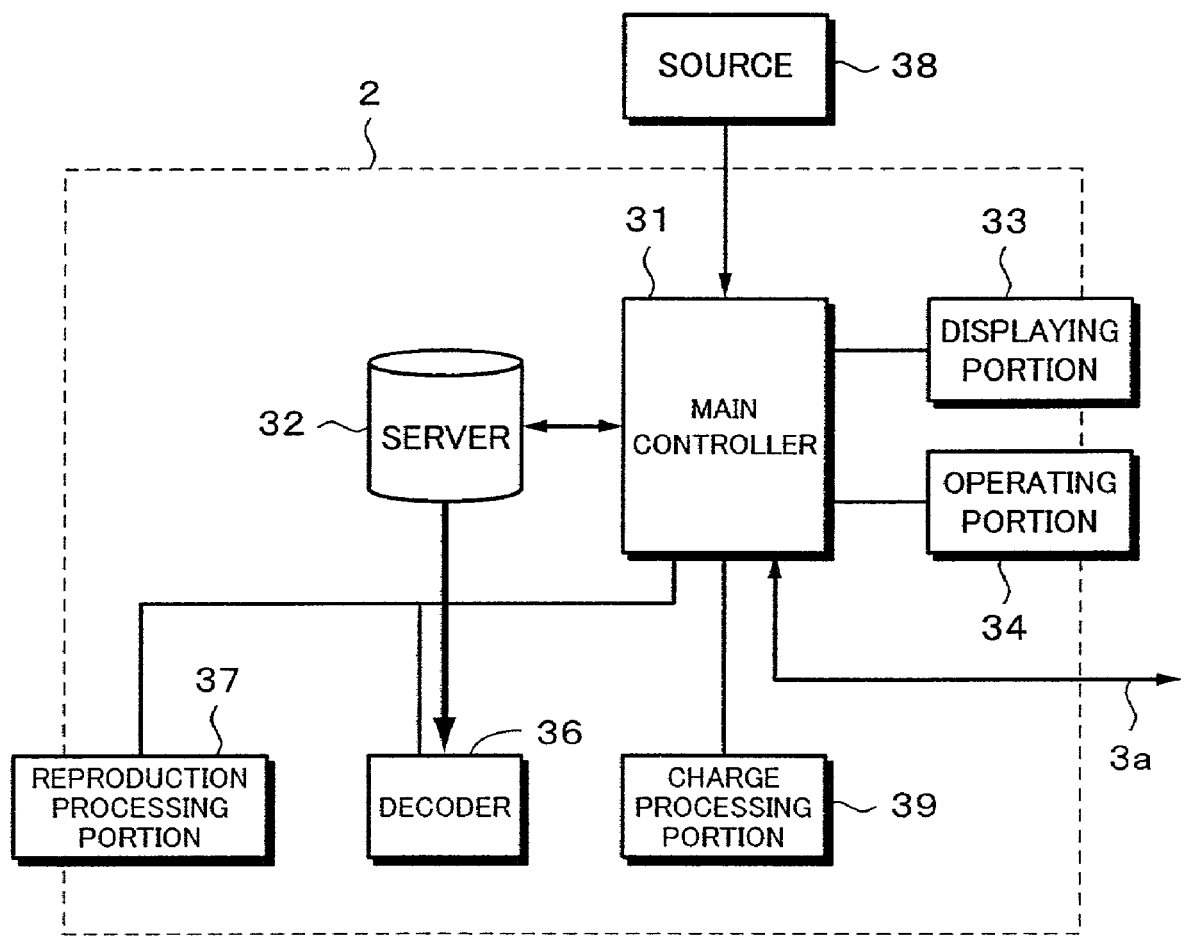
FIG. 4 is a block diagram showing the structure of an example of a main server.

FIG. 4 shows the structure of the main server 2. The structure of the main server 2 is the same as the structure of the server system 1. In other words, the main server 2 is composed of a main controller 31, a server 32, a displaying portion 33, an operating portion 34, a decoder 36, a reproduction processing portion 37, a music data source 38, and a charge processing portion 39. As the source 38, for example a CD reproducing device can be used. Since the main server 2 need not record music data to a record medium, the main server 2 does not have the recording portion 15 disposed in the server system 1.

The charge processing portion 39 receives user identification information of a user who bought whole music information (namely, music data and additional information) and identification information of music information that the user bought from the server system 1, calculates the price for the music information using price information of additional information of the music information, and charges the user 24 for the calculated price. In this case, the charge processing portion 39 may transmit the calculated price to the server system 1, inform the user thereof, and inquire whether or not he or she agrees with the informed price. When the user agrees with the informed charging condition, he or she can actually buy the music information. The charge processing portion 39 receives user identification information and identification information of music information that he or she actually bought (this identification information is referred to as buying information) from the server system 1 and charges the user for the music information.

By receiving user identification information containing name and telephone number of user, music identification information, and credit card number or user identification information, music identification information, and user's bank account number from the home 23 or the store 21, the charge processing portion 39 calculates the price charged to the user using price information corresponding to the music identification information, generates charging information using user's credit card number or received user's bank account number, transferring bank account number, and amount-of-money information corresponding to price, and transmits the generated charging information to an external settlement center that is an external bank server. When price information of additional information corresponding to music identification information has been stored in the store 21 shown in FIG. 1, the charge processing portion 39 is disposed. The charge processing portion 39 may calculate amount-of-money information corresponding to music identification information and transmit the calculated amount-of-money information to the main server 2.

With the above-described system shown in FIG. 3, the music distributor 22 can accomplish a new music distributing method. In addition, with the server system 1, the music distributor 22 can know the popularity of music by information representing what music information the user bought. When the user 24 has a reproducing device 5 in his or her home 23, he or she can reproduce the music that he or she bought with the reproducing device 5. The music that the user 24 bought can be reproduced with not only the reproducing device 5 disposed in the home, but a portable reproducing device.

However, in the distributing system shown in FIG. 3, when the user has not decided what music he or she will buy, he or she selects music he or she will buy and performs a money paying process and so forth. When the user decides what music he or she will buy, he or she searches for music information and listens to demos of music. Corresponding to the result, the user selects music. The larger the number of titles of music, the longer the user should spend time for selecting music. Thus, with the automatic vending machine and so forth, the user cannot smoothly buy music.

Figure 5:
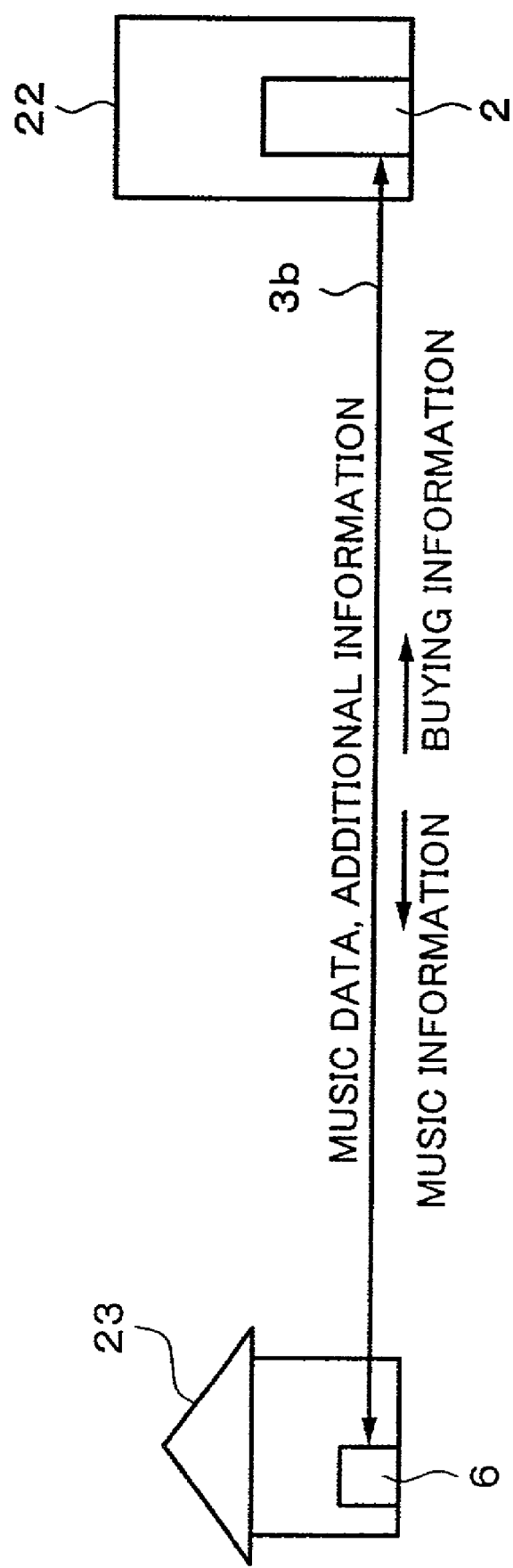
FIG. 5 is a block diagram showing another example of the content distributing system.

FIG. 5 shows a system that can solve such a problem. A distributor 22 has a main server 2. The main server 2 is connected to a server system 6 of a home 23 through Internet 3b. Music data as music information and additional information are transferred from the distributor 22 to the home 23. Instead of or in addition to the Internet 3b, a channel of a digital broadcast (digital satellite broadcast, data broadcast, or the like) may be used. FIG. 5 shows only one home (server system 6). In reality, however, many server systems 6 are connected to the main server 2 of the distributor 22.

Figure 6:
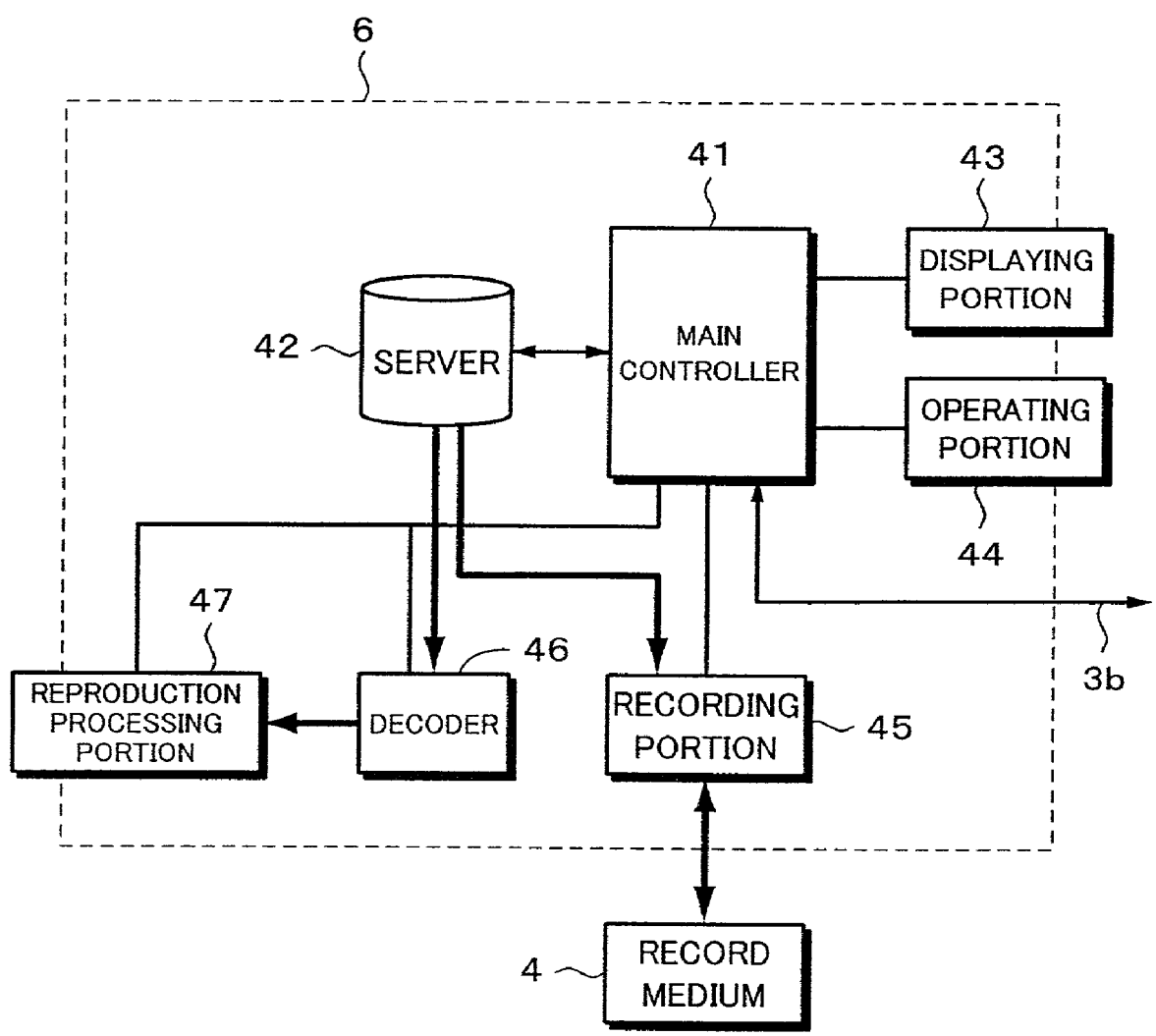
FIG. 6 is a block diagram showing the structure of another example of the server system.

FIG. 6 shows the structure of the server system 6. The structure of the server system 6 is the same as the structure of the server system 1. In other words, the server system 6 is composed of a main controller 41, a server 42, a displaying portion 43, an operating portion 44, a recording portion 45, a decoder 46, and a reproduction processing portion 47. In the same manner as with the server system 1, the user listens to demos of music stored in the server 42 and records selected music data to the record medium 4 using the recording portion 45.

The server 42 may store music information of package media such as CD besides music data received from the main server. In this case, the server 42 requires a reading device for package media and a highly efficient encoder.

Since it is assumed that the server system 6 is used by particular users, the server system 6 does not have a money paying device. The price for music information that the user bought is paid using an electronic commerce system performed through the Internet or a telephone line or using a bank account transfer. As was descried above, the server system 6 disposed in the home 23 transmits user identification information containing name and telephone number of user, music identification information, and credit card number or user identification information, music identification information, and user's bank account number to the main server 2.

In the system shown in FIG. 5, since a deciding operation for music that the user will buy is performed in the home, he or she can smoothly buy music in comparison with the system shown in FIG. 3. However, in the system shown in FIG. 5, it is necessary to download music information from the main server 2 to the server 42 of the server system 6. Even if music data is compressed, it still has a data amount. Thus, when the line capacity is insufficient, it takes a long time to download music data through the Internet 3b. Thus, there is a possibility of which the line connection fee that the user should pay remarkably increases. To decrease the data amount, the compression ratio of the highly efficient coding may be increased. However, when the compression ratio is increased, the sound quality is deteriorated to a level that the user cannot permit. In addition, when a different format of the highly efficient coding from that defined for a record medium is used, the hardware scale adversely increases.

The present invention can solve problems involved in the music distributing systems shown in FIGS. 3 and 5. Next, with reference to FIG. 7, an embodiment of the present invention will be described.

FIG. 7 shows a store 21, a distributor 22, and a home 23. In the store 21 such as a convenience store, a server system 1 is disposed as an automatic vending machine. The distributor 22 has a main server 2. In the home 23, a reproducing and connecting device 7 is disposed. The structure of the reproducing and connecting device 7 is the same as the structure of the above-described server system 6 disposed in the home. The reproducing and connecting device 7 has an Internet connecting device. However, the reproducing and connecting device 7 does not have a recording portion. In reality, the reproducing and connecting device 7 is composed of a personal computer, a modem, and a record medium reproducing device.

The server system 1 and the main server 2 are connected through a bi-directional dedicated line 3a. Through the dedicated line 3a, whole music information (namely, music data and additional information) is transmitted. As was described above, music information stored in the server system 1 is updated periodically or non-periodically. In addition, the main server 2 and the reproducing and connecting device 7 are connected through the Internet 3b. Additional information of music information is transmitted from the main server 2 to the reproducing and connecting device 7 through the Internet 3b. When necessary, authentication information is transmitted from the main server 2 to the reproducing and connecting device 7. Music data of music information corresponds to additional information. Other than demos contained in additional information are transmitted through the Internet 3b. On the other hand, when a money paying process is performed with the reproducing and connecting device 7, buying information is transmitted from the reproducing and connecting device 7 to the main server 2 through the Internet 3b.

In the home 23, the user 24 receives additional information with respect to main information stored in the server system 1 from the main server 2 of the distributor 22. As was described with reference to FIG. 2, album title and song names are obtained with text information of additional information. In addition, pictures of album jackets as video information of additional information are used to search for music. Moreover, demos of music can be reproduced with fade information. In reality, music data corresponding to a time period of fade information is supplied as other information of additional information from the main server 2 to the reproducing and connecting device 7.

The user 24 can search for and decide music that he or she will buy corresponding to the additional information. When the user 24 performs a money paying process with the reproducing and connecting device 7, buying information that designates music that he or she will buy is transmitted to the main server 2 through the Internet 3b. In this case, the buying information may contain information that identifies a user. As was described above, the server system 6 disposed in the home 23 transmits as buying information user identification information containing name and telephone number of user, music identification information, and credit card number or user identification information, music identification information, and user's bank account number to the main server 2.

Corresponding to buying information, the charge processing portion 39 of the distributor's server 22 calculates the price charged to the user using price information corresponding to music identification information, generates charging information using amount-of-money information corresponding to user's bank account number for credit card number, or received user's bank account number, transferring bank account number, and price, and transmits the generated charging information to an external settlement center such as an external bank server. When the bank server has correctly executed the charging process, the bank server transmits a normal completion notice to the main controller 11 of the distributor's server 22. The main controller 11 of the distributor 22 generates authentication information for the user and correlatively stores the buying information and the authentication information to the storing portion (server) 12. In addition, the main controller 22 transmits the authentication information to the home 23.

A song designated by the buying information can be recorded to the record medium 4 by the user 24 in the store 21. In the home 23, when the user has decided music that he or she will buy and performed the money paying process, the distributor 22 who has received the buying information issues authentication information in the above-described manner. The user receives the authentication information through the Internet 3b. The user 24 inputs the authentication information that he or she has received when he or she has bought the song in the store 21 to the server system 1 (automatic vending machine). For example, as the authentication information, a numeric value of several digits is used. The user 24 inputs the numeric value to the automatic vending machine and confirms buying information with a displaying device of the automatic vending machine. Consequently, the server system 1 need not perform the money paying process.

In the store 21, the user can change buying information that he or she decided in the home 23. The money paying process is performed by transmitting buying information from the home 23 to the main server 2 through the Internet 3b. Alternatively, the money paying process can be performed with a paying device of the server system 1 disposed in the store 21.

As a money paying means of the store 21, a cash inserting hole to which the user can insert cash, a prepaid card inserting hole to which the user can insert a prepaid card whose memory stores points or the like, a credit card inserting hole to which the user can insert a credit card, a bank card inserting hole to which the user can inert a bank card, or the like can be used.

The main controller 11 informs the user of total amount-of-money information of price information corresponding to music identification information of buying information with the displaying portion 13. The user inserts corresponding cash to the cash inserting hole. After the main controller 11 has confirmed the insertion of the corresponding cash, the main controller 11 reads music data corresponding to the buying information from the storing portion 12 and starts recoding the music data to the storing portion 4.

In addition, likewise, the user inserts a prepaid card to the prepaid card inserting hole. After the main controller 11 has confirmed the points equivalent to the corresponding cash, the main controller 11 performs a decrementing process for the points of the prepaid card, reads music data corresponding to the buying information from the storing portion 12, and starts recording the music data to the storing portion 4.

The user inserts a credit card to the credit card inserting hole. In addition, the user inputs a password with the operating portion 14. The main controller 11 reads the credit card number and transmits it to the distributor 22 along with the password and total amount-of-money information. The main controller 31 of the distributor 22 transmits the received credit card number, password, transferring bank account number, and total amount-of-money information to an external bank server. After the bank server has properly performed the charging process, the bank server transmits a signal that represents that the charging process has been properly performed to the store 21 through the distributor 22. The main controller 11 reads music data corresponding to the buying information from the storing portion 12 and starts recording the music data to the storing portion 4. In this example, the normal charging process includes a database updating process for the bank server so as to perform immediate settlement process and later settlement processes.

The user inserts a bank card to the bank card inserting hole. In addition, the user inputs a password with the operating portion 14. The main controller 11 reads the user's bank account number of the bank card and transmits it to the distributor 22 along with the password and total amount-of-money information. The main controller 31 of the distributor 22 transmits the received user's bank account number, password, transferring bank account number, and total amount-of-money information to an external bank server. When the external bank server has properly performed the charging process, the bank server transmits a signal that represents that the charging process has been properly performed to the store 21 through the distributor 22. The main controller 11 reads music data corresponding to the buying information from the storing portion 12 and starts recording the music data to the record medium 4.

An information transmitting/receiving device of the reproducing and connecting device 7 disposed in the home 23 is not limited to a personal computer and a modem. Instead, as the information transmitting/receiving device, a cellular phone, a car navigation, a digital satellite broadcast, and so forth can be used.

Figure 8B:
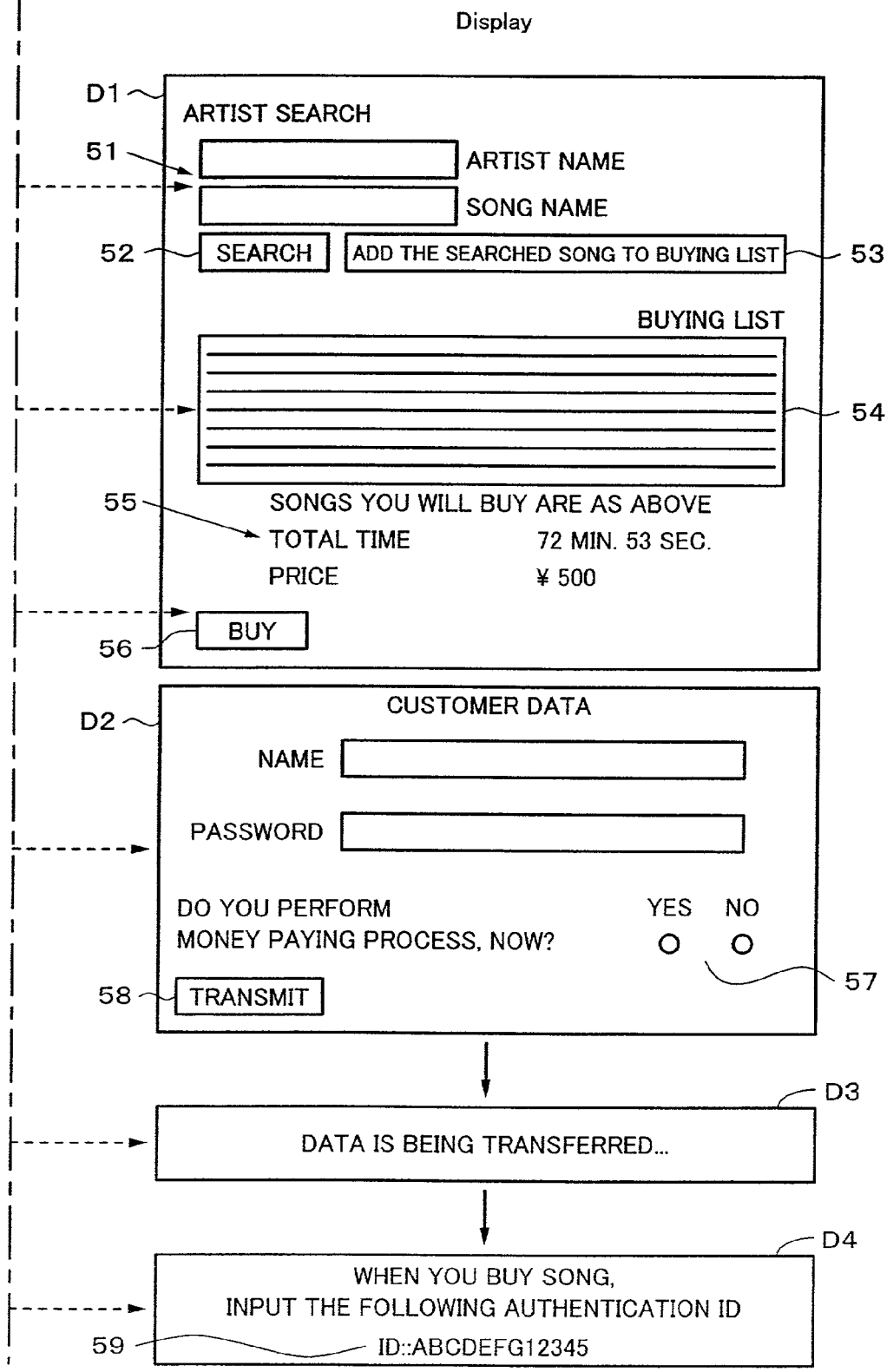
FIG. 8 is a flow chart for explaining a process according to the embodiment of the present invention.

FIG. 8 is a flow chart showing a process according to the embodiment described with reference to FIG. 7. The process shown in FIG. 8 is a process performed by the reproducing and connecting device 7. Data (message pages and dialog boxes) is displayed on a display of the reproducing and connecting device 7.

At step S1, the main controller 41 determines whether or not the user will newly buy music data corresponding to the user's operation of the operating portion 44. When the determined result at step S1 represents that the user will newly buy music data, the flow advances to step S2. At step S2, the main controller 41 causes the displaying portion 43 to display information with respect to music that the user has selected with the operating portion 44. When the determined result at step S1 represents that the user has already bought music, the flow advances to step S3. At step S3, the main controller 41 reads existing buying information from the server 42 of the reproducing and connecting device 7. In other words, at step S2, the user can change or cancel the buying information.

At step S2, a dialog box D1 is displayed on the screen of the displaying device of the reproducing and connecting device 7. Reference numeral 51 represents a displaying portion for searching for an artist name and a song name. Reference numeral 52 represents a button pressed when a search is started. Reference numeral 53 represents a button pressed when a song that has been searched is added to a buying list. When the button 53 is pressed, a song displayed on the displaying portion 51 is added to the buying list 54. A displaying portion 55 displays the total performance time of songs listed on the buying list 54 and the price for the songs. After the selecting process for songs that the user will buy is completed, the flow advances to step S4. At step S4, the user temporarily decides to buy the songs. In other words, the user presses a button 56 on the dialog box D1. Thus, the main controller 42 displays a dialog box D2 for a money paying process on the displaying portion 43.

At step S5, the main controller 42 determines whether or not the user pays money corresponding to the user's operation of the operating portion 44. When the determined result at step S5 represents that the user pays the money, the flow advances to step S6. At step S6, the money paying process is performed. The money paying process is performed with the dialog box D2. On the dialog box D2, the user inputs his or her name and password. Thereafter, with a selection button 57, the user can select the money paying process. Thereafter, the user presses a transmission button 58. When the transmission button 58 is pressed, the buying information is transmitted to the main server 2 (at step S7). The buying information is composed of information with respect to a buying song and information with respect to paid money. For example, as the buying information, user identification information containing name and telephone number of user, music identification information, and credit card number or user identification information, music identification information, and user's bank account number are transmitted to the main server 2. Alternatively, when the distributor 22 has stored the corresponding credit card number and user's bank account number, the reproducing and connecting device 7 may transmit only user identification information, password, and music identification information to the main server 2.

In addition, a message page D3 that represents that data is being transmitted is displayed for the user. At step S8, authentication information that has been generated in the above-described manner is obtained from the main server 2. For example, a message page D4 displays ID 59 as authentication information. The user 24 takes a memo of the ID. The main server 2 correlatively stores the issued authentication information and the received buying information to the storing portion (server 32) shown in FIG. 4.

Figure 9B:
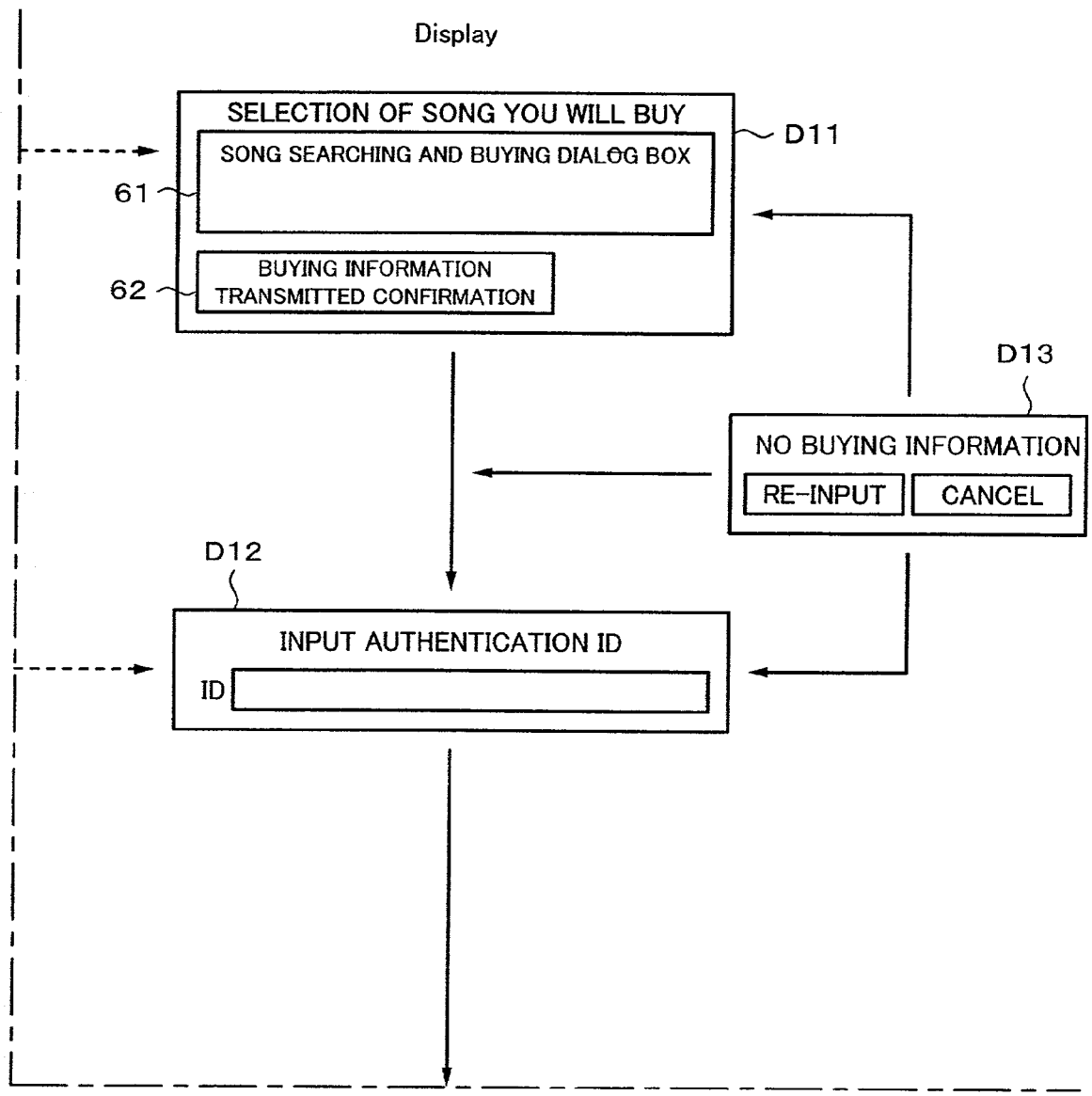
FIG. 9 is a flow chart for explaining a process according to the embodiment of the present invention.
Figure 9C:
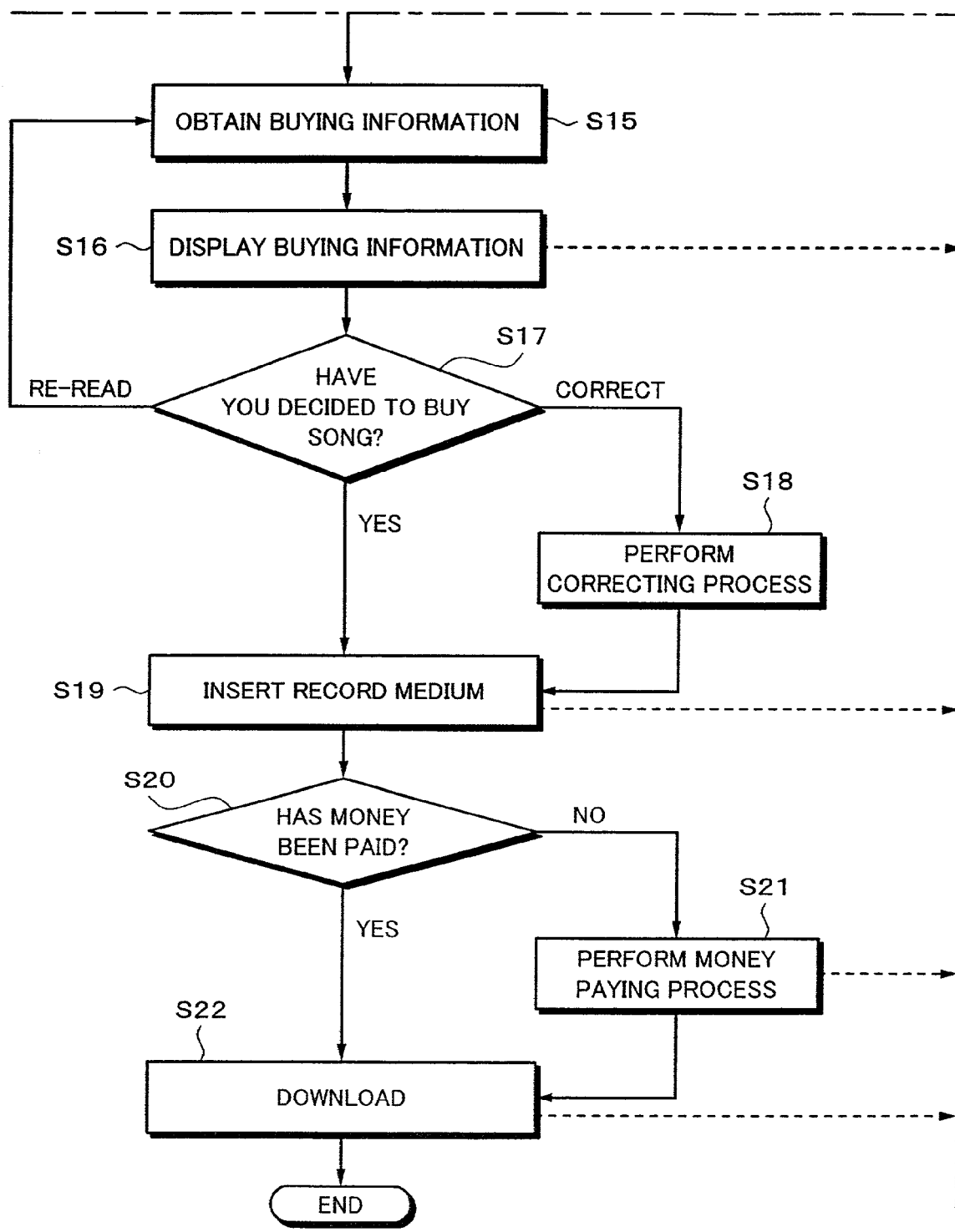

FIG. 9 is a flow chart showing a process performed when the user records a song that he or she bought from the server system (automatic vending machine) 1 disposed in the store 21 to a record medium 4. The process shown in FIG. 9 is a process performed by the server system 1. Data (message pages and dialog boxes) of the process is displayed on the display (displaying portion 13) of the server system 1.

Since a process for selecting a song that the user will buy can be performed with the server system 1, at step S11 as the first step, the main controller 11 causes the displaying portion 13 to display a buying song selection dialog box denoted by D11. The dialog box D11 is composed of a song searching and buying field 61 and a buying information transmitted confirmation button 62. In the home 23, the above-described process is performed. When the user has decided a song that he or she will buy, he or she presses the buying information transmitted confirmation button 62. Thereafter, at step S12, the main controller 11 determines that the buying information has been transmitted.

When the buying information has been transmitted at step S12, the flow advances to step S13. At step S13, the main controller 11 displays a dialog box D12. The dialog box D12 displays an input field for authentication information (ID 59) that the user has obtained. The main controller 11 transmits the input authentication information from the server system 1 of the store 21 to the main server 2. At step S14, it is determined whether or not the input authentication information has been stored in the main server 2. In other words, the main controller 31 of the main server 2 determines whether or not authentication information transferred from the server system 1 has been stored in the server 32. When the server system 1 receives the determined result, the flow advances to step S14. At step S14, it is determined whether or not the authentication information has been stored. When the determined result at step S14 represents that the authentication information has not been stored, the flow returns to step S11 or step S13.

When the authentication information has not been stored, the main controller 11 displays a dialog box D13 for the user. The dialog box D13 displays a message that represents that there is no buying information and buttons for selecting a process that the user can perform next. In other words, when the user selects a process for re-inputting authentication information, the flow returns to step S13. On the other hand, when the user selects a process for canceling the buying, the flow returns to step S11.

When the determined result of the main controller 11 at step S14 represents that the authentication information has been stored, the flow advances to step S15. At step S15, the server system 1 obtains buying information from the main server 2. At step S16, the main controller 11 displays the obtained buying information as a dialog box D14. At step S17, the main controller 11 determines whether or not the user will buy music data using the buying information corresponding to the user's operation. When the user presses a buying button 63 on the dialog box D14, the buying of the music data is confirmed. When the user wants to correct (change) the buying information, he or she presses a correction button 64. When the user wants to re-read the buying information, he or she presses re-read button 65. At step S18, a correcting process for the buying information is performed. When the re-reading process is selected, the flow returns to step S15.

When the determined result of the main controller 11 at step S17 represents that the user has decided to buy music data or when the determined result of the main controller 11 at step S18 represents that the user's correcting process has been completed, the flow advances to step S19. At step S19, the main controller 11 displays a message page D15 that requests the user to insert a record medium 4 to the server system 1. At step S20, the main controller 11 determines whether or not the use has paid the money. According to the embodiment, it has been determined that authentication information has been stored in the server, the determined result at step S20 represents that the user has paid the money. When the authentication information is not checked at step S21, the flow advances to step S21. At step S21, the money paying process is executed by the above-described money paying means. When the determined result of the main controller 11 at step S20 represents that the money has been paid or the money paying process has been completed, the flow advances to step S22. At step S22, music data of a song that the user bought is downloaded from the storing portion 12 to the record medium 4. While the music data is being downloaded, a message page D17 informing the user that the music data is being downloaded is displayed.

Figure 10:
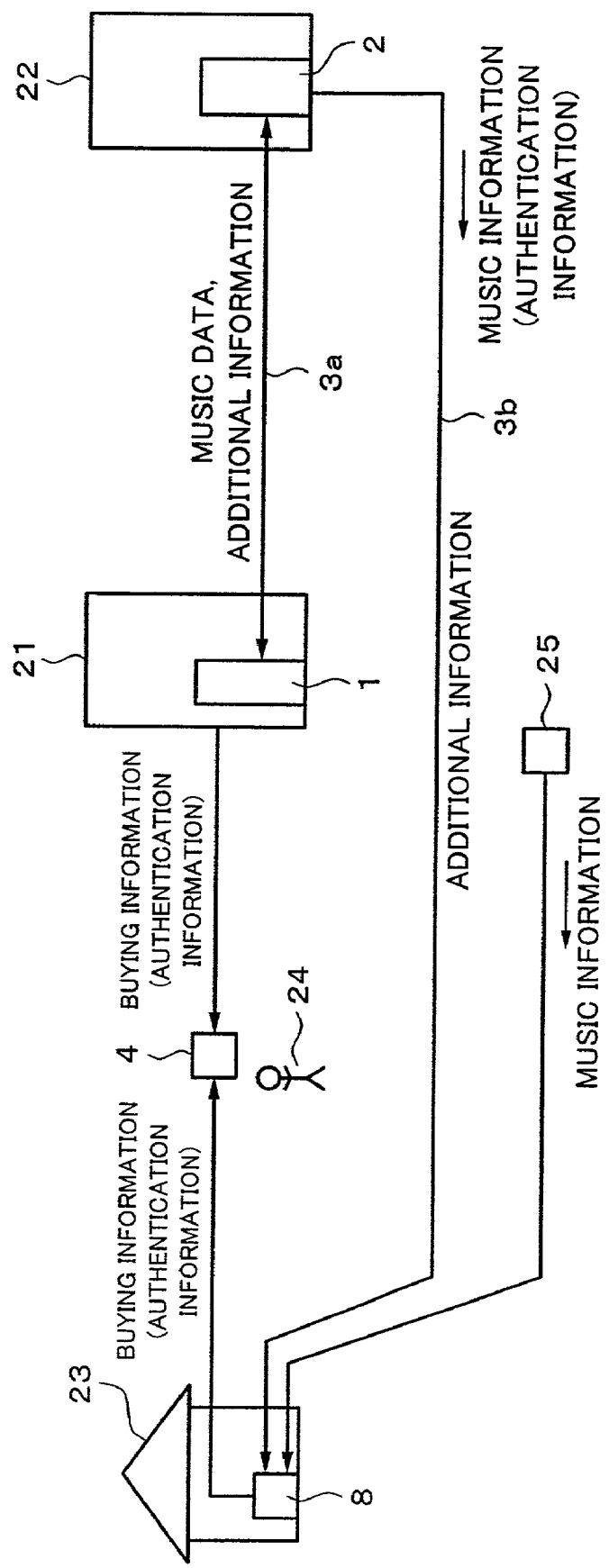
FIG. 10 is a block diagram showing a content distributing system according to another embodiment of the present invention.

Next, with reference to FIG. 10, another embodiment of the present invention will be described. In the other embodiment, as with the above-described embodiment, a server system 1 as a automatic vending machine is disposed in a store 21. The server system 1 is connected to a main server 2 of a distributor 22 through a dedicated line 3a. In a home 23, a recording, reproducing, and connecting device 8 is disposed. The recording, reproducing, and connecting device 8 and the main server 2 are connected through the Internet 3b. However, according to the other embodiment, a bi-directional line such as the Internet 3b is not always required.

In the home 23, the user performs an operation for selecting a song that he or she will buy. This operation is performed corresponding to additional information of music information received by the server system 1 from the main server 2. In this case, it is not necessary to obtain music information (additional information) from the main server 2. Additional information for selecting a song that the user will buy may be obtained from advertisement media 25 such as a magazine. In reality, additional information is contained in a magazine in the format of barcode. The barcode is read by the recording, reproducing, and connecting device 8. As a result, the additional information is read.

With the recording, reproducing, and connecting device 8, the user selects a song that he or she will buy corresponding to the additional information. When necessary, the user listens to demos of songs. Buying information that represents a song that the user has selected is recorded to a record medium 4. However, it is not necessary that a record medium on which buying information is recorded is the same as a record medium on which music data is recorded. The user takes to the store 21 a record medium 4 on which the buying information has been recorded. The server system 1 reads the buying information from the record medium 4 and records (downloads) a song designated by the buying information to a record medium 4 or another record medium. In addition, the amount of money necessary for buying the song is paid with the money paying device (the above-described money paying means) of the server system 1.

According to the other embodiment, since the user always has buying information, when he or she performs the money paying process with the server system 1, the server system 1 need not issue authentication information. Thus, it is not necessary to connect the recording, reproducing, and connecting device 8 disposed in the home and the main server 2 through a bi-directional transmission medium. However, as shown in FIG. 10, when a bi-directional transmission medium such as the Internet 3b is used, as with the above-described embodiment, the user can perform the money paying process in advance in his or her home 23. In this case, although authentication information is required, it is also recorded to the record medium 4. Alternatively, buying information that represents a song that the user will buy can be transmitted from the recording, reproducing, and connecting device 8 to the main server 2. Only authentication information that has been issued can be recorded to the record medium 4. In this case, the server system 1 reads authentication information recorded on the record medium 4 and downloads music data designated by the authentication information to the record medium 4. At that point, when authentication information and buying information have been correlatively recorded in the storing portion 32 of the main server 2, the authentication information of the server system 1 is transferred to the main server 2. Buying information corresponding to authentication information is searched. Music data corresponding to the buying information is downloaded from the main server 2 to the record medium 4 of the server system 1. When authentication information and buying information have been correlatively stored in the storing portion 12 of the server system 1, the storing portion 12 is searched for buying information corresponding to authentication information of the server system 1. In addition, music data corresponding to buying information is downloaded from the storing portion 12 of the server system 1 to the record medium 4.

FIG. 11 is a flow chart showing a process of the other embodiment described with reference to FIG. 10. The process shown in FIG. 11 is a process of the recording, reproducing, and connecting device 8. Data (dialog box) is displayed on a display (displaying portion 43) of the recording, reproducing, and connecting device 8. The money paying process is performed by the above-described money paying means of the server system 1.

At step S21 as the first step, the main controller 41 determines whether or not the user newly buys a song corresponding to the user's operation. When the determined result at step S21 represents that the user newly buys a song, the flow advances to step S23. At step S23, the main controller 41 displays a dialog box for selecting a song that the user will buy on the displaying portion 43. When the determined result at step S21 represents that the user has already bought a song, the flow advances to step S22. At step S22, the main controller 41 reads buying information that has been input by the user from the server 42 of the recording, reproducing, and connecting device 8. In other words, at step S23, the user can change or cancel the buying information.

At step S23, a dialog box D21 is displayed on the displaying device of the recording, reproducing, and connecting device 8. Reference numeral 71 is a field for searching an artist name and a song name. Reference numeral 72 represents a button pressed when a search is started. Reference numeral 73 represents a button pressed when a searched song is added to a buying list. When the button 73 is pressed, a song displayed or highlighted in the field 71 is added to the buying list 74. A field 75 displays the total performance time and the price of songs that are listed on the buying list 74.

After the user has completed the buying song selecting process at step S23, the flow advances to step S24. At step S24, the main controller 41 determines that the buying button 76 has been pressed and that the user has temporarily decided to buy the songs. At step S25, the main controller 41 controls the recording of the determined buying information to the record medium 4.

When the main server 2 performs the money paying process through the home 23 in the above-described manner, the main controller 41 may record only authentication information to the record medium 4. Alternatively, the main controller 41 may record both buying information and authentication information to the record medium 4.

Figure 12C:
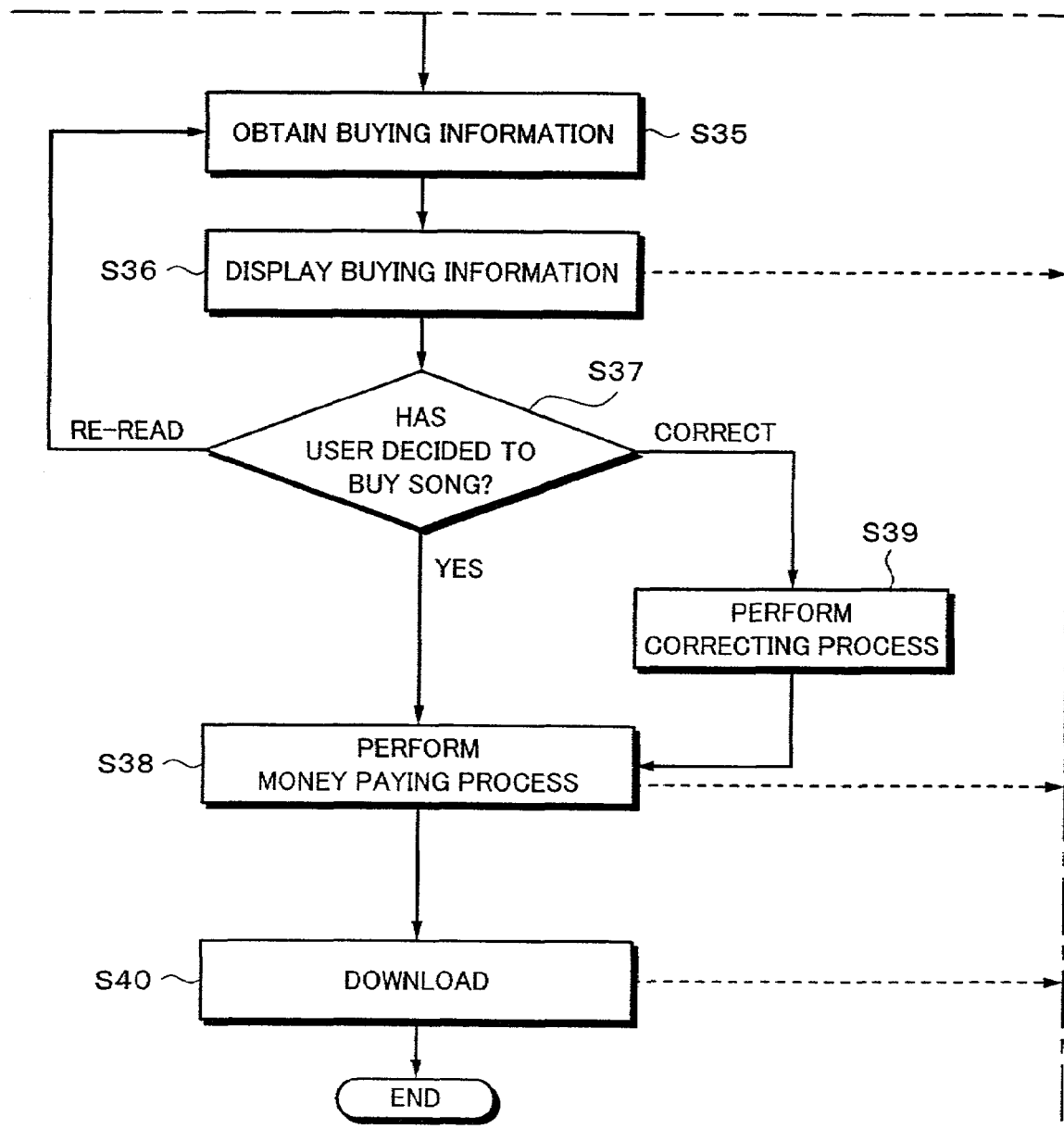
FIG. 12 is a flow chart for explaining a process of one embodiment of the present invention.
Figure 12D:
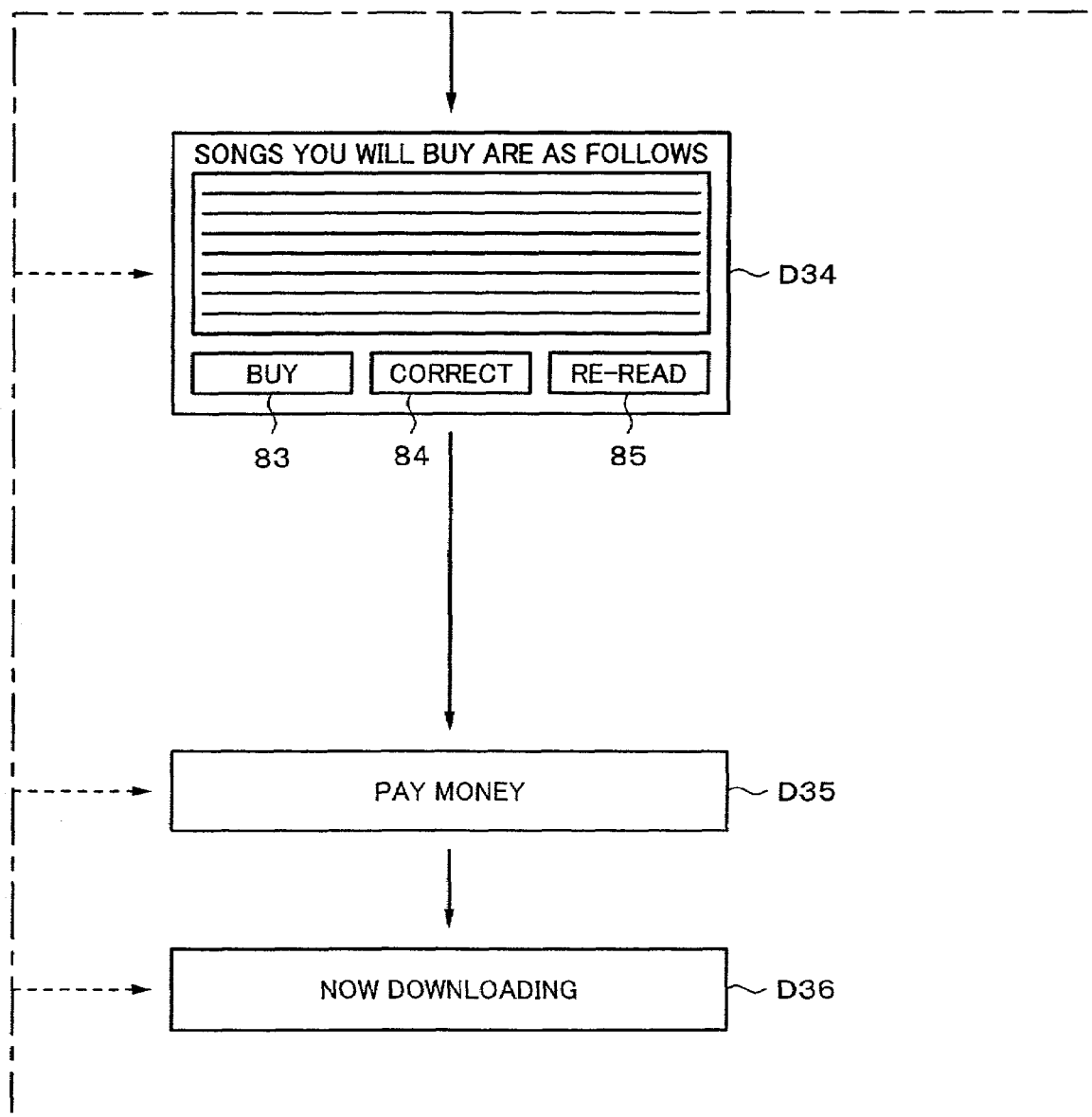

FIG. 12 is a flow chart showing a process performed when the user records a song that he or she bought from the server system (automatic vending machine) 1 disposed in the store 21 to the record medium 4. The process shown in FIG. 12 is performed by the server system 1. Data (message pages and dialog boxes) shown in FIG. 12 is displayed on the display of the server system 1.

Since a process for selecting a song that the user will buy can be performed with the server system 1, at step S31 as the first step, a buying song selection dialog box denoted by D31 is displayed for the user. The dialog box D31 is composed of a song searching and buying field 81 and a buying information designated confirmation button 82. In the home 23, the above-described process is performed. When the user has decided a song that he or she will buy, he or she presses the buying information designated confirmation button 82. With the operation, the main controller 11 determines that the buying information has been designated at step S32.

Thereafter, at step S33, the main controller 11 displays a message page D32 that requests the user to insert a record medium 4 to the server system 1. Thus, the user inserts the record medium 4 to the server system 1. At step S34, the main controller 11 determines whether buying information has been recorded on the record medium 4. When the determined result at step S34 represents that buying information has not been recorded on the record medium 4, a message page D33 is displayed for the user. Thereafter, the flow returns to step S31. When the determined result at step S34 represents that buying information has been recorded on the record medium 4, the flow advances to step S35. At step S35, buying information is read from the record medium 4.

At step S36, the buying information that has been read from the record medium 4 is displayed. As shown with a dialog box D34, a buying song list is displayed corresponding to the buying information. The dialog box D34 contains a buy button 83, a correction button 84, and a re-read button 85. With reference to the dialog box D34 corresponding to the buying information, the user finally decides whether or not he or she will buy the songs at step S37.

At step S37, when the user presses the buy button 83 of the dialog box D34, the buying of the songs is confirmed. When the user wants to correct (change) the buying information, he or she presses the correction button 84. When the user wants to re-read the buying information, he or she presses the re-read button 85. At step S39, a correcting process for the buying information is performed. When the re-reading process is selected, the flow returns to step S35.

When the user has decided to buy songs at step S37 or when the user has performed the correcting 25 process at step S39, the flow advances to step S38. At step S38, the money paying process is performed by the above-described money paying means. In this case, a message page D35 that requests the user to pay the required money is displayed. The user can pay the money to the server system 1 with cash, electronic money (points), credit card, or the like. After the money paying process has been completed, the flow advances to step S40. At step S40, music data of songs that the user bought is downloaded corresponding to the buying information. In other words, corresponding to the buying information, music information recorded in the server 12 is recorded to the record medium 4. While the music information is being downloaded, a message page D36 that represents the downloading is displayed.

When only authentication information has been recorded on the record medium 4, the main controller 11 transfers the authentication information to the main server 2. The main controller 31 of the main server 2 searches for the authentication information transferred from the server 32 and sends buying information recorded corresponding to the authentication information to the server system 1. The main controller 11 searches the server 12 for music data corresponding to the buying information that has been sent back, reads the searched music data from the server 12, and records the music data to the record medium 4.

When both authentication information and buying information have been recorded on the record medium 4, the main controller 11 transfers the authentication information to the main server 2. The main controller 31 of the main server 2 searches for the authentication information transferred from the server 32. When the main controller 31 has successfully searched for authentication information, the main controller 31 sends an authentication signal to the server system 1. Corresponding to the authentication signal that has been sent back, the main controller 11 searches the server 12 for music data corresponding to buying information stored in the record medium 4, reads the music data from the server 12, and records the music data to the record medium 4.

In the above description, the present invention is applied for a music distribution. In addition, the present invention can be applied to systems that distribute audio and video, only video, computer data such as computer software, and so forth. The place in which the user decides a song that he or she will buy is not limited to a home. In other words, in any place apart from the server system 1, the user can buy a song. In addition, the above-mentioned dedicated line and Internet are examples of communication mediums. In other words, various types of transmission mediums can be used.

DESCRIPTION OF REFERENCE NUMERALS

1 SERVER SYSTEM
2 MAIN SERVER
4 RECORD MEDIUM
7 REPRODUCING AND CONNECTING DEVICE
8 RECORDING, REPRODUCING, AND CONNECTING DEVICE
21 STORE
22 MUSIC DISTRIBUTOR
23 HOME
24 USER

The invention claimed is:

1. An apparatus comprising:
a receiver configured to receive a content signal corresponding to a music item and additional information related to the music item;
a display unit configured to display at least a portion of the additional information related to the music item; and
a controller configured to store data for obtaining the music item corresponding to the content signal in a memory, the data for obtaining the music item being stored based on a received user input in advance of the memory being accessed by a first computer,
wherein the data for obtaining the music item is transmitted from the memory to the first computer upon the memory being accessed by the first computer.

2. The apparatus according to claim 1, wherein the additional information includes identification information identifying the music item.

3. The apparatus according to claim 2, wherein the identification information includes a title of the music item.

4. The apparatus according to claim 1, wherein the receiver is in one-way communication with a second computer that transmits the content signal to the receiver.

5. The apparatus according to claim 1, wherein the first computer obtains the music item from a second computer.

6. The apparatus according to claim 1, wherein the apparatus is a mobile apparatus.

7. An apparatus comprising:
a read-out unit configured to read data for obtaining a music item from a memory, the data for obtaining the music item being stored in the memory by a device in advance of the memory being connected to the apparatus; and
a controller configured to transmit the data for obtaining the music item to a computer and receive the music item from the computer,
wherein the data for obtaining the music item, which is stored in advance in the memory, is read by the read-out unit upon connecting the memory to the apparatus.

8. The apparatus according to claim 7, further comprising a local storage device for storing the music item.

9. The apparatus according to claim 7, wherein the controller is further configured to store the music item in the memory.

10. A computer-implemented method comprising:
receiving a content signal corresponding to a music item and additional information related to the music item;
displaying at least a portion of the additional information related to the music item; and
storing data for obtaining the music item corresponding to the content signal in a memory, the data for obtaining the music item being stored based on a received user input in advance of the memory being accessed by a first computer,
wherein the data for obtaining the music item is transmitted from the memory to the first computer upon the memory being accessed by the first computer.

11. The method according to claim 10, wherein the additional information includes identification information identifying the music item.

12. The method according to claim 11, wherein the identification information includes a title of the music item.

13. The method according to claim 10, wherein the music item is received via one-way communication with a second computer that transmits the content signal.

14. The method according to claim 10, wherein the first computer obtains the music item from a second computer.

15. The method according to claim 10, implemented on a mobile apparatus.

16. A computer-implemented method comprising:
accessing a memory storing data for obtaining a music item, the data for obtaining the music item being stored in the memory by a device in advance of accessing the memory;
reading the data for obtaining the music item from the memory upon accessing the memory;
transmitting the data for obtaining the music item to a computer; and
receiving the music item from the computer.

17. The method according to claim 16, further comprising storing the music item in a local storage device.

18. The method according to claim 16, further comprising storing the music item in the memory.

19. A system comprising:
a first apparatus comprising:
a receiver configured to receive a content signal corresponding to a music item and additional information related to the music item;
a display unit configured to display at least a portion of the additional information related to the music item; and
a controller configured to store data for obtaining the music item corresponding to the content signal in a memory, the data for obtaining the music item being stored based on a received user input, and
a second apparatus comprising:
a read-out unit configured to access the memory to read the data for obtaining the music item from the memory, the data for obtaining the music item being stored in the memory by the first apparatus in advance of the memory being accessed by the second apparatus; and a controller configured to transmit the data for obtaining the music item to a computer and receive the music item from the computer, wherein the data for obtaining the music item, which is stored in advance in the memory by the first apparatus, is read by the read-out unit upon connecting the memory to the second apparatus.

20. The system according to claim 19, wherein the data for obtaining the music item is stored in the memory after being disconnected from the first apparatus and before being connected to the second apparatus.

21. The system according to claim 20, wherein the second apparatus stores the music item in the memory upon reading the data for obtaining the music item from the memory.

* * * * *